(12) United States Patent
Okazaki

(10) Patent No.: US 9,212,773 B2
(45) Date of Patent: Dec. 15, 2015

(54) CONNECTOR

(75) Inventor: Tsuyoshi Okazaki, Yokohama (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 609 days.

(21) Appl. No.: 13/580,767

(22) PCT Filed: Feb. 10, 2011

(86) PCT No.: PCT/JP2011/052955
§ 371 (c)(1),
(2), (4) Date: Sep. 6, 2012

(87) PCT Pub. No.: WO2011/105234
PCT Pub. Date: Sep. 1, 2011

(65) Prior Publication Data
US 2012/0326435 A1 Dec. 27, 2012

(30) Foreign Application Priority Data

Feb. 23, 2010 (JP) .................................. 2010-037874

(51) Int. Cl.
*F16L 37/088* (2006.01)

(52) U.S. Cl.
CPC .................................. *F16L 37/088* (2013.01)

(58) Field of Classification Search
CPC .... F16L 2201/10; F16L 37/088; F16L 37/144
USPC ......................... 285/23, 84, 93, 305, 319, 321
See application file for complete search history.

(56) References Cited

U.S. PATENT DOCUMENTS

| | | | |
|---|---|---|---|
| 8,033,575 B2 | 10/2011 | Tsurumi | |
| 2004/0075274 A1* | 4/2004 | Szabo | F16L 37/144 285/305 |
| 2005/0087981 A1* | 4/2005 | Yamada | F16L 37/0982 285/81 |

(Continued)

FOREIGN PATENT DOCUMENTS

| | | |
|---|---|---|
| CN | 1243927 A | 2/2000 |
| CN | 101072967 A | 11/2007 |

(Continued)

OTHER PUBLICATIONS

Japanese Patent Office, "Office Action for JP 2010-037874", Aug. 6, 2013.

(Continued)

*Primary Examiner* — Daniel P Stodola
*Assistant Examiner* — Zachary Dragicevich
(74) *Attorney, Agent, or Firm* — Manabu Kanesaka

(57) ABSTRACT

A lock member (16) moves between a standby position, in which a locking part (86) of a locking piece (78) provided on the lock member is placed inside a gap (44) provided between a projecting part (40) and a projecting part (42) provided on a lock part (36) of a connection part (18), and a connected position, in which the locking part is placed beneath the projecting part (42), and the lock member (16) moves to the connected position and is locked by the locking piece (78) when a pipe (12) is inserted up to a prescribed position. Also, an elastic piece (80) and the locking piece (78) are pushed to spread outward and accumulate urging force when being contacted by a flange part (12A) of the pipe (12), but return along an outer perimeter surface of the flange part (12A) and release the urging force when the locked state in the standby position of the locking part (86) is unlocked.

9 Claims, 20 Drawing Sheets

(56) References Cited

U.S. PATENT DOCUMENTS

| | | | |
|---|---|---|---|
| 2006/0082145 A1* | 4/2006 | Steveley | F16L 37/144 285/305 |
| 2006/0267341 A1 | 11/2006 | Takayanagi | |
| 2007/0273150 A1* | 11/2007 | Tsurumi | 285/305 |
| 2009/0167020 A1* | 7/2009 | Blivet | F16L 37/144 285/317 |
| 2010/0007142 A1 | 1/2010 | Ogawa et al. | |
| 2012/0211977 A1* | 8/2012 | Callahan | F16L 37/144 285/313 |

FOREIGN PATENT DOCUMENTS

| | | |
|---|---|---|
| CN | 101644368 A | 2/2010 |
| JP | 2005-127394 A | 5/2005 |
| JP | 2010/270867 A | 1/2010 |

OTHER PUBLICATIONS

China Patent Office, "Office Action for CN201180010684.8," Dec. 3, 2013.

* cited by examiner

CONNECTOR

RELATED APPLICATIONS

The present application is National Phase of International Application No. PCT/JP2011/052955 filed Feb. 10, 2011, and claims priority from Japanese Application No. 2010-037874, filed Feb. 23, 2010.

TECHNOLOGICAL FIELD

The present invention relates to a connector for connecting a pipe.

BACKGROUND TECHNOLOGY

As an example of a connector for a pipe, patent document 1 discloses a connector comprising a connector body into which a pipe can be inserted, and a retainer that can be installed on the connector body.

Specifically, the retainer is positioned in a provisionally fastened position where the pipe can be inserted into the connector, and the positioning of the connector body is released by the insertion of the pipe, at which time, the retainer moves to a position for preventing the pipe from coming off, and prevents the pipe from coming off.

Here, a spring member (urging member) is provided between the connector body and the retainer, and the spring member moves the retainer having been released in positioning to the position for preventing the pipe from coming off, whereby it can be confirmed whether the pipe is connected in a properly connected position of the connector body.

Patent document 1: Japanese Unexamined Patent Publication No. 2006-105241

DISCLOSURE OF THE INVENTION

Problem to be Solved by the Invention

In consideration of the above circumstances, the present invention provides a connector with which the connected position of a pipe can be confirmed and sagging of an urging member can be prevented.

Means for Solving the Problem

A first aspect of the present invention is a connector, to which is connected a pipe having an annular flange part on an outer perimeter surface, comprising: a connector body having a circular opening part in which the pipe is inserted; and a confirmation member provided on the connector body, and moving between a standby position, in which the flange part of the pipe is capable of passing through the opening part, and a connected position, in which the confirmation member moves in a radial direction of the opening part and the pipe is connected at a prescribed position. The confirmation member has a lock mechanism locking the confirmation member to the connector body in the standby position; and an urging member extending into the opening part, the urging member being pushed to spread outward when being contacted by the flange part during insertion of the pipe and to unlock the locked state of the confirmation member by the lock mechanism, and returning while turning inward along the outer perimeter surface of the flange part, and moving the confirmation member to the connected position.

In the above aspect, the connector body having the circular opening part is provided, and the pipe having the annular flange part on the outer perimeter surface is inserted into the opening part. The confirmation member is provided on the connector body, and the confirmation member moves between the standby position, in which the flange part of the pipe is capable of passing through the opening part, and the connected position, in which the confirmation member is moved in the radial direction of the opening part and the pipe is connected at the prescribed position.

The lock mechanism and the urging member are provided on the confirmation part, and the lock mechanism locks the confirmation member to the connector body in the standby position. Also, the urging member extends into the opening part of the connector body, is pushed to spread outward when being contacted by the flange part during insertion of the pipe, and unlocks the locked state of the confirmation member by the lock mechanism. By this, the urging member returns, turns inward along the outer perimeter surface of the flange part, and moves the confirmation member to the connected position.

In other words, when the pipe is inserted up to the prescribed position in the state (standby state) in which the confirmation member is placed in the standby position, the confirmation member automatically moves from the standby position to the connected position (connected state), and therefore the fact that the pipe is connected at the prescribed position can be confirmed. Therefore, the confirmation member does not move to the connected position unless the pipe has been inserted up to the prescribed position, and misrecognition of the connected state of the pipe can be avoided.

Here, the urging member is pushed to spread outward when being contacted by the flange part of the pipe and urging force is accumulated, but the urging member returns and releases the urging force when the locked state of the confirmation member by the lock mechanism is unlocked. Therefore, the problem of sagging of the urging member due to creep can be suppressed. "Return" here includes the case in which all of the urging force in the urging member is released and the urging member returns to the natural state, as well as the case in which some urging force remains in the urging member.

Also, the urging member extends into the opening part of the connector body, is pushed to spread outward when being contacted by the flange part, and unlocks the locked state of the confirmation member by the lock mechanism. By this, the urging member returns, turns inward along the outer perimeter surface of the flange part, and moves the confirmation member to the connected position.

In other words, the operation of connection of the pipe is simple because the connector is a so-called "one-touch type," in which the pipe is connected to the connector by just inserting the pipe into the opening part of the connector, and the connector is convenient with good operability because there is no need for the operator to manually move the confirmation member.

A second aspect of the present invention is based on the first aspect of the present invention, wherein a stopper is provided on the confirmation member, the stopper being positioned further toward a side opposite a direction of insertion of the pipe from the flange part in the connected position and overlapping with the flange part when viewed from an axial direction of the pipe.

In the above configuration, the stopper is provided on the confirmation member, is positioned further toward the side opposite the direction of insertion of the pipe from the flange part in the connected position of the confirmation member, and overlaps with the flange part when viewed from the axial direction of the pipe.

In other words, the stopper is placed on the near side and the flange part is placed on the deep side when the pipe is viewed toward the direction of insertion of the pipe in the connected position of the confirmation member. Therefore, the movement toward the side opposite the direction of insertion of the pipe is restricted in the state in which the pipe is connected to the connector.

A third aspect of the present invention is based on the first or second aspect of the present invention, wherein the urging member is an elastic piece extending into the opening part from outside of the connector body, and contacts with the pipe at a position having crossed the axis of the pipe inserted into the opening part in the standby position of the confirmation member.

The confirmation member is in the standby position in the state in which the pipe is not inserted. According to the above configuration, when the pipe is inserted in the standby position of the confirmation member, the elastic piece contacts with the pipe at the position having crossed the axis of the pipe, and is pushed to spread outward, and urging force is accumulated in the elastic piece.

Therefore, when the locked state of the lock mechanism is unlocked, the elastic piece returns while releasing the urging force, and turns inward along the outer perimeter surface of the flange part of the pipe. By this, the confirmation member can be moved to the connected position. In other words, the confirmation member automatically moves to the connected position when the pipe is inserted in the standby position of the confirmation member and the pipe is inserted up to the prescribed position.

A fourth aspect of the present invention is based on the first or second aspect of the present invention, wherein the urging member includes an elastic piece extending into the opening part from outside of the connector body, being pushed to spread outward when being contacted by the flange part during insertion of the pipe, and unlocking the locked state of the confirmation member by the lock mechanism; and a spring piece converting an insertion force of the pipe into a pressing force moving the confirmation member to the connected position, and turning the elastic piece inward along the outer perimeter surface of the flange part.

In the above configuration, the urging member includes the elastic piece and the spring piece, the elastic piece extends into the opening part from outside of the connector body, and is pushed to spread outward when being contacted by the flange part during insertion of the pipe, and unlocks the locked state of the confirmation member by the lock mechanism. Meanwhile, the spring piece converts the insertion force of the pipe into the pressing force moving the confirmation member to the connected position, and turns the elastic piece inward along the outer perimeter surface of the flange part.

In other words, here, the members are divided in accordance with their functions between the elastic piece for unlocking the locked state of the confirmation member by the lock mechanism and the spring piece for moving the confirmation member to the connected position. Therefore, for example, there is no need to move the confirmation member to the connected position because the elastic piece returns and turns inward along the outer perimeter surface of the flange part of the pipe.

Accordingly, the elastic piece can be formed with a sufficient length to unlock the locked state of the confirmation member by the lock mechanism. Also, because the members are divided in accordance with the respective functions, the necessary urging force for the function can be set respectively, and the operability in connection of the pipe can be further improved.

A fifth aspect of the present invention is based on the third or fourth aspect of the present invention, wherein the lock mechanism includes a leg piece extending in parallel with the elastic piece; a pressing part provided on an end part of the leg piece, positioned to the outside of the elastic piece, and pressed on contact by the elastic piece; and a coupling part provided on an end part of the leg piece, and coupling with a coupling-accepting part formed on the connector body in the standby position and the connected position.

In the above configuration, the leg piece extending in parallel with the elastic piece is provided on the lock mechanism, and the pressing part and coupling part are provided on the end parts of the elastic piece. The pressing part is positioned to the outside of the elastic piece, and is pressed to contact by the elastic piece. The elastic piece is pushed to spread outward when being contacted by the flange part of the pipe, but at this time, the elastic piece contacts with and presses the pressing part and pushes the leg piece to spread outward by way of the pressing part.

Meanwhile, the coupling part couples with the coupling-accepting part formed on the connector body and locks the confirmation member in the standby position and the connected position of the confirmation member, but when the leg piece is pushed to spread outward by the pressing part, the coupled state between the coupling part and the coupling-accepting part is released, and the locked state of the confirmation is unlocked.

A sixth aspect of the present invention is based on the fifth aspect of the present invention, wherein there is provided a guide path for guiding the coupling part toward a direction in which the pressing part retreats from outside of the elastic piece when the confirmation member returns to the standby position from the connected position.

When the confirmation member moves from the standby position to the connected position, the elastic piece is pushed to spread outward whereby the leg piece is pushed to spread outward by way of the pressing part, the coupling part moves away from the coupling-accepting part, and the locked state is unlocked. Also, when the locked state of the lock mechanism is unlocked, the elastic piece returns, turns inward along the outer perimeter surface of the flange part of the pipe, and moves the confirmation member to the connected position.

Meanwhile, when the pipe is removed from the connector, the confirmation member is first moved from the connected position to the standby position, and at this time, the elastic piece is pushed to spread outward along the outer perimeter surface of the flange part of the pipe. By this, the elastic piece contacts with the pressing part, and the leg piece is pushed to spread outward by way of the pressing part. In other words, in the course of moving the confirmation part from the connected position to the standby position, the confirmation member cannot be locked to the connector body in the standby position of the confirmation member.

Accordingly, in the above configuration, there is provided a guide path for guiding the coupling part toward the direction in which the pressing part retreats from outside of the elastic piece when the confirmation member returns to the standby position from the connected position. Therefore, even though the elastic piece was pushed to spread outward, the pressing part is placed in the position having retreated from outside of the elastic piece, and therefore the elastic piece does not press the pressing part, and the leg piece is not pushed to spread. In other words, the state in which the confirmation member is held in the standby position is maintained. Therefore, the confirmation member can be prevented from returning again to the connected position from the standby position when the pipe is removed from the connector.

A seventh aspect of the present invention is based on the fifth or sixth aspect of the present invention, wherein the leg piece and the elastic piece are integrally molded.

According to the above configuration, the leg piece and the elastic piece are integrally molded, whereby the number of parts can be reduced and reduction of cost can be achieved.

An eighth aspect of the present invention is based on any aspect of the third to seventh aspects, wherein at least one elastic piece is provided.

According to the above configuration, it is not absolutely necessary to provide a plurality of elastic pieces, and one elastic piece is allowable. By this, the degree of freedom of design is expanded.

Effect of the Invention

Because the present invention is configured as above, a pipe can be connected to the connector by just inserting the pipe into the connector, and the connected state of the pipe can be confirmed. Also, sagging of the urging member can be prevented, and the operability is good because there is no need for the operator to manually move the confirmation member.

BRIEF DESCRIPTION OF THE DRAWINGS

FIG. 14A-14C are side views for describing the operation of the lock member illustrated in FIG. 11, wherein FIG. 14A illustrates the state before the lock member is installed on the housing, FIG. 14B illustrates the standby position of the lock member, and FIG. 14C illustrates the locked state of the lock member.

FIG. 23A-23C are side views for describing the operation of the lock member illustrated in FIG. 21, wherein FIG. 23A illustrates the connected state of the lock member, FIG. 23B illustrates the provisional standby state of the lock member, and FIG. 23C illustrates the standby state of the lock member.

BEST MODES FOR CARRYING OUT THE INVENTION

Connectors according to the embodiments of the present invention are described.

First Embodiment

Figure 1:
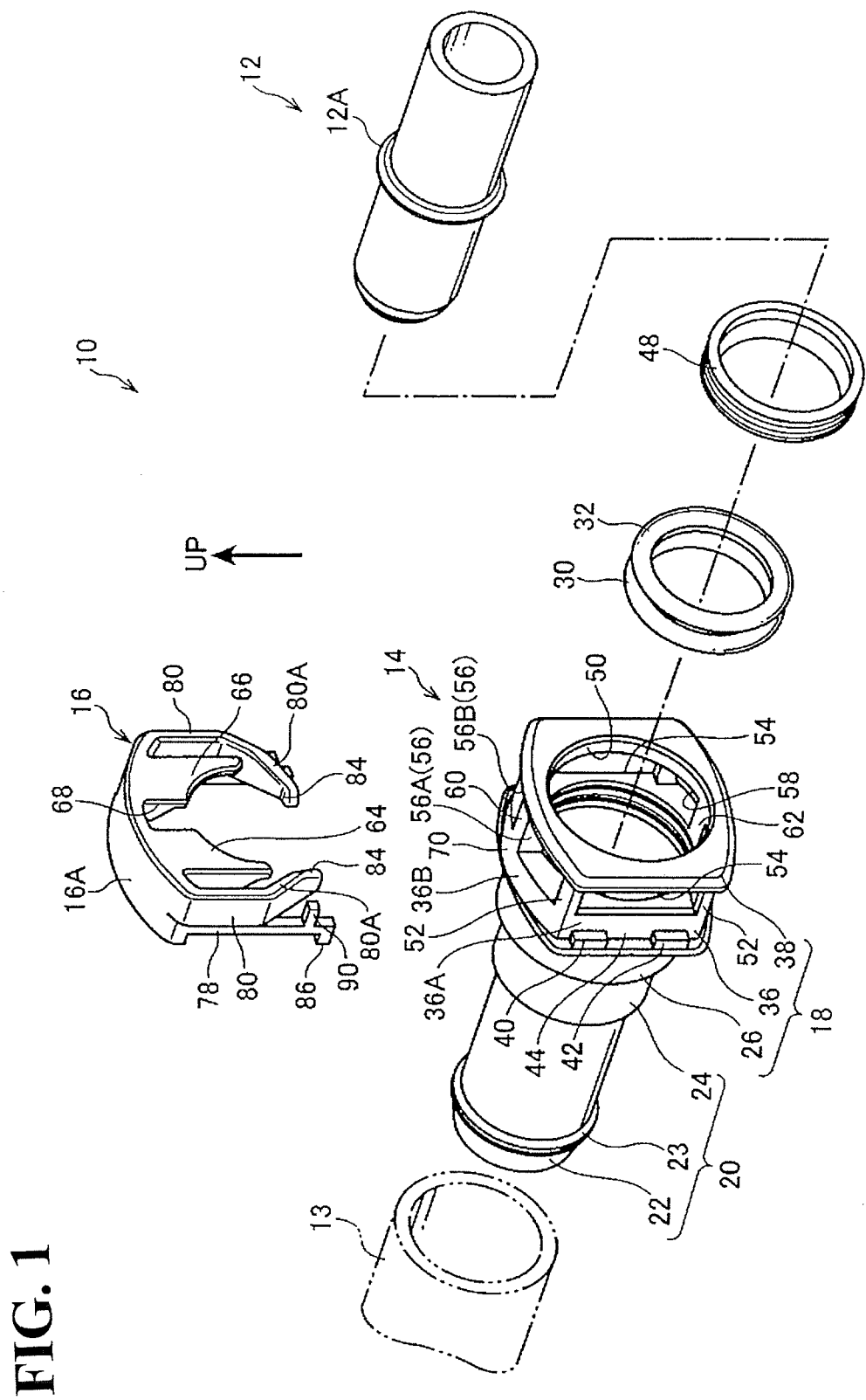
FIG. 1 is an exploded perspective view illustrating the connector according to a first embodiment.

The connector 10 illustrated in FIG. 1, for example, is used for fastening of coolant piping inside an engine compartment of a vehicle, and is configured so that a pipe 12 made of metal is connected and a tube 13 made of resin is installed. The configuration of the connector 10 is first described. For convenience of description, the description is given using the UP arrow illustrated in FIG. 1 to indicate the upward direction of the connector 10.

(Configuration of the Connector)

As illustrated in FIG. 1, the connector 10 comprises a roughly cylindrical housing (connector body) 14, and a roughly inverted-U-shaped lock member (confirmation member) 16 installed on an outer perimeter of the housing 14. A connection part 18 on which the lock member 16 is installed to be movable and to which the pipe 12 is connected is provided on one end side of the housing 14, and an insertion part 20 in which the tube 13 is inserted is provided on the other end side of the housing 14.

A taper part 22 is formed on a leading end side of the insertion part 20 (other end part of the housing 14), and a leading end part of the taper part 22 is made smaller in diameter than the tube 13 so that the tube 13 is easy to insert.

Also, an annular projecting part 23 is provided on a rear end part of the taper part 22. The annular projecting part 23 is made larger in diameter than the inner diameter dimension of the tube 13, and the tube 13 is pressed in when the tube 13 is inserted into the insertion part 20.

A medium diameter part 24 having a larger diameter than the outer diameter dimension of the insertion part 20 is provided between the insertion part 20 and the connection part 18, and a movement of the tube 13 is restricted by contacting of a leading end face of the tube 13 to an end face of the medium diameter part 24. In this state, the tube 13 is securely fastened to the insertion part 20 by a custom clamp, or the like, not illustrated.

Meanwhile, one end side of the connection part 18 is roughly cylindrical, and the external shape on the other end side is roughly square. A large diameter part 26 having a larger diameter than the medium diameter part 24 provided on the insertion part 20 is provided on one end side of the connection part 18, and an annular recessed part (not illustrated) is placed in recessed form on an inner perimeter surface of the large diameter part 26. O-rings 30 and 32 are fitted into the annular recessed part, and fill and seal a gap between the inner perimeter surface of the large diameter part 26 and an outer perimeter surface of the pipe 12 when the pipe 12 is connected to the connection part 18.

Although not illustrated, an annular spacer being rectangular in section may be placed between the O-ring 30 and O-ring 32, and the O-ring 30 and O-ring 32 may be compressed so that the sealing strength with the outer perimeter surface of the pipe 12 is increased.

Also, a lock member 36 and an installation part 38 are provided along the axial direction of the housing 14 on the other end side of the connection part 18, and the lock member 36 is placed on the side of the large diameter part 26. The lock member 16 to be described is made capable of being installed on the installation part 3, and the installed lock member 16 is locked in a prescribed position (connected position to be described) by the lock part 36.

Therefore, on a side wall 36A of the lock part 36, parallelepiped-form projecting parts (coupling-accepting parts) 40 and 42 are placed to project respectively on an upper part and a lower part of the side wall 36A, and a gap 44 is provided between the projecting part 40 and the projecting part 42 (to be described later).

Also, an annular recessed part (not illustrated) is placed in recessed form on an inner perimeter surface of the lock part 36, and an annular bush 48 is made capable of being fitted in the annular recessed part in a state projecting from the inner perimeter surface of the lock part 36. The inner diameter dimension of the bush 48 is made roughly identical to the outer diameter dimension of the pipe 12. The bush 48 is made, for example, with polyacetal, nylon, or the like.

Here, a circular opening part 50 is formed along the axial direction of the housing 14 on the installation part 38 (one end part of the housing 14), the opening part 50 is made larger in diameter than the inner diameter dimension of the bush 48, and is made as a size such that an annular flange part 12A formed on the outer perimeter surface of the pipe 12 can be inserted.

The installation part 38 has a plurality of through-holes 54, 56, and 58 formed on an angular part, leaving bridging parts 52 in between. A through-hole 56 is provided on an upper part of the installation part 38 and a through-hole 58 is provided on a lower part, and reinforcing ribs 60 and 62 bisecting the through-holes 56 and 58 are provided respectively in the center parts in the long directions of the through-holes 56 and 58. The rigidity of the installation part 38 (connection part 18) is reinforced by the reinforcing ribs 60 and 62.

Meanwhile, the lock member 16 is made capable of being installed from above the installation part 38. A pair of stoppers 64 and 66 hangs down from an inner surface of a base part 16A positioned in the center of the lock member 16, corresponding to through-holes 56A and 56B formed on the installation part 38. Here, a cutout part 68 allowing the reinforcing rib 60 provided on the upper part of the installation part 38 to be inserted through is formed between the stopper 64 and the stopper 66.

When the lock member 16 is installed from above the installation part 38, the cutout part 68 passes through to the reinforcing rib 60, and the stoppers 64 and 66 are inserted respectively in the through-holes 56A and 56B. Thus, by dividing the stopper 64 and the stopper 66, the lock member 16 is made easy to elastically deform toward a direction (radial direction) of moving both end parts apart.

Figure 9A:
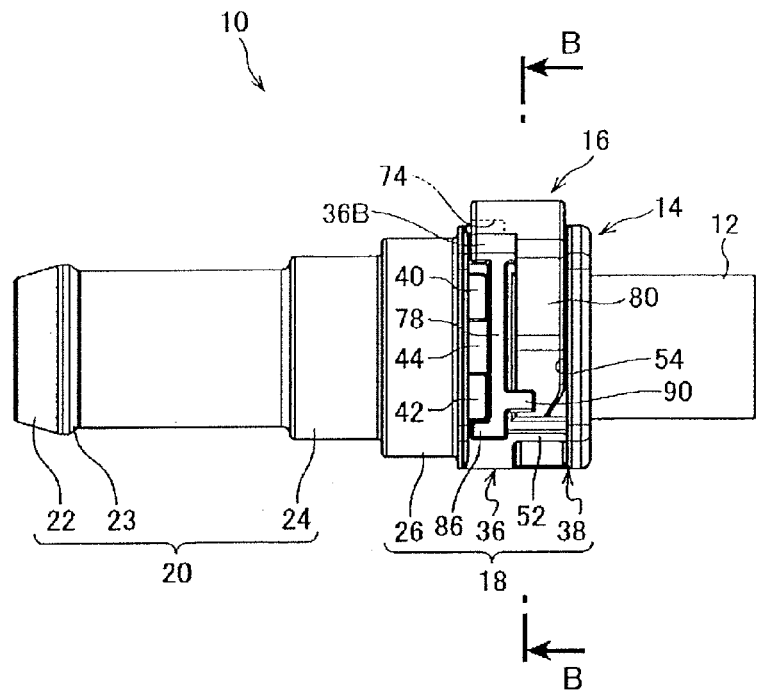
FIG. 9A is a side view of the connector corresponding to FIG. 5.
Figure 9B:
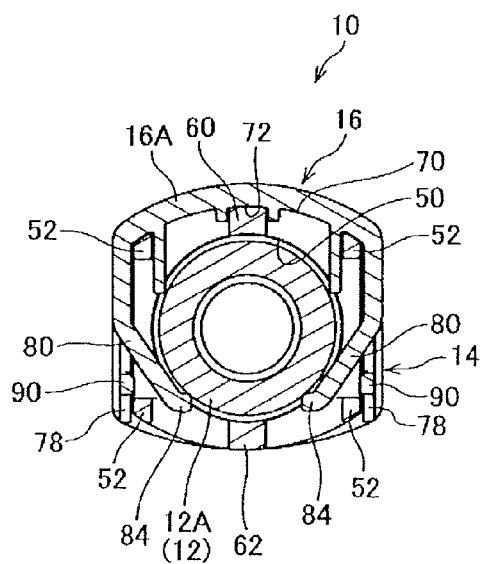
FIG. 9B is a sectional view along B-B line in FIG. 9A.

Also, a base part 16A of the lock member 16 is made as an arc surface 72 (see FIG. 6B) having roughly the same curvature as an arc surface 70 formed on an upper wall 36B of the lock part 36, and the base part 16A of the lock member 16 is made capable of surface contacting with the upper wall 36B of the lock part 36 in a locked position of the lock member 16 to be described later, as illustrated in FIG. 9B.

Also, as illustrated in FIG. 9A, an operating recessed part 74 is placed in recessed form in the center part of the base part 16A of the lock member 16 in a position facing opposite the upper wall 36B of the connection part 18 (upper wall 36B of the lock part 36), the upper wall 36B of the connection part 18 is exposed in the connected position of the lock member 16, and is made such that a slotted screwdriver or custom jig can be inserted.

Meanwhile, as illustrated in FIG. 1, leading end parts of the stoppers 64 and 66 are made as arcs having roughly the same radius of curvature as the outer diameter dimension of the pipe 12, and is made capable of contacting with the outer perimeter surface of the pipe 12. A gap is provided in the axial direction of the housing 14 between the stoppers 64 and 66 and the bush 48, and the flange part 12A is made capable of being placed inside the gap.

The radius of curvature of the inner diameter dimension of the bush 48 and of the leading ends of the stoppers 64 and 66 are made roughly the same as the outer diameter dimension of the pipe 12, and therefore are made smaller in diameter than the outer diameter dimension of the flange part 12A of the pipe 12. Therefore, the state in which the flange part 12A is placed inside the gap, becomes a state in which the flange part 12A is covered by the stoppers 64 and 66 (the stoppers 64 and 66 and the flange part 12A overlap) when the pipe 12 is viewed toward the direction of insertion of the pipe 12 as illustrated in FIG. 10B. In other words, a movement in the axial direction of the pipe 12 is restricted by the bush 48 and the stoppers 64 and 66.

Figure 10A:
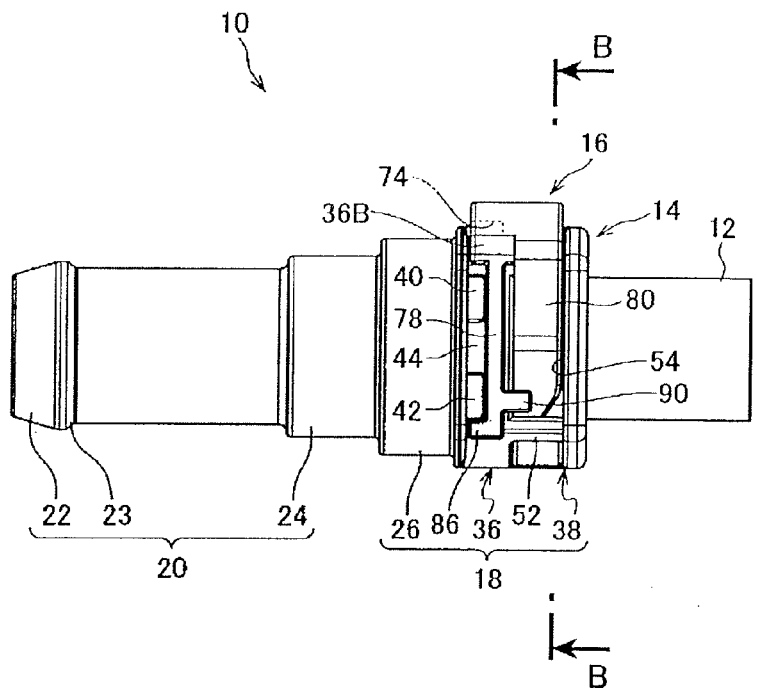
FIG. 10A is a side view of the connector corresponding to FIG. 5.
Figure 10B:
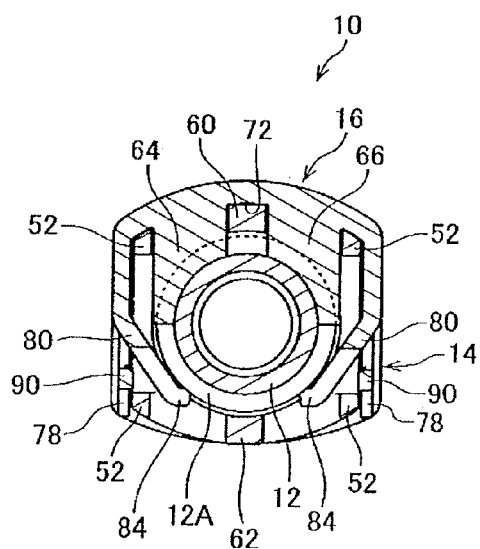
FIG. 10B is a sectional view along B-B line in FIG. 10A.

Meanwhile, as illustrated in FIG. 1, the angular parts of the end faces of the lock part 36 and the installation part 38 of the connection part 18 extend from the outer faces of the upper wall 36B and the bridging parts 52 of the lock part 36, and as illustrated in FIG. 10, in the state in which the lock member 16 is installed on the installation part 38, the angular parts are made capable of contacting with the end faces in the width direction of the lock member 16, so that the movement of the lock member 16 along the axial direction of the housing 14 is restricted and the lock member 16 does not rattle.

Also, as illustrated in FIG. 1, elastic pieces (urging members) 80 and locking pieces (leg pieces) 78 hang down respectively from both ends in the long direction of the base part 16A of the lock member 16. The locking pieces 78 are provided corresponding to the lock part 36, and the elastic pieces 80 are provided Corresponding to the installation part 38. Slits 82 are provided between the elastic pieces 80 and the locking pieces 78, and the locking pieces 78 and the elastic pieces 80 are respectively made capable of being elastically deformed.

Figure 6A:
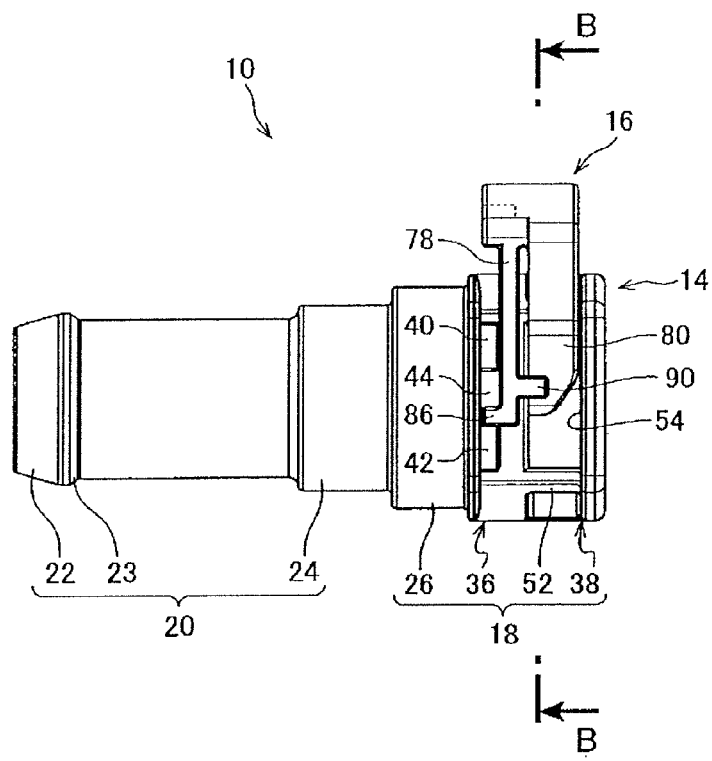
FIG. 6A is a side view of the connector corresponding to FIG. 2.
Figure 6B:
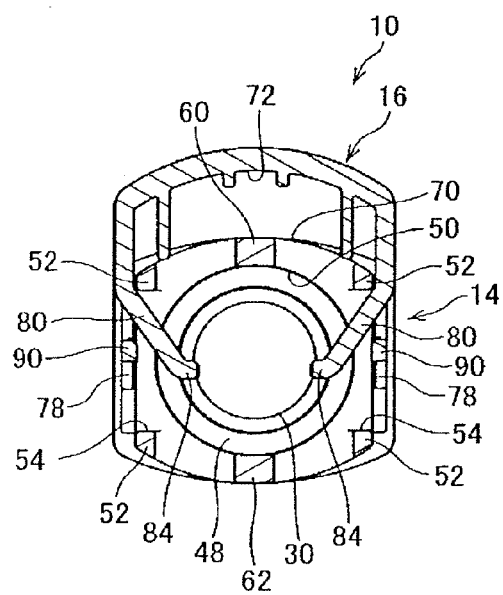
FIG. 6B is a sectional view along B-B line in FIG. 6A.

Both end sides of the elastic pieces 80 are bent toward the direction of moving closer to each other, run through the through-holes 54 formed on the side wall of the installation piece 38, and extend further toward the inner diameter side from the bush 48 (see FIG. 6B). Projecting parts not illustrated are provided in the center parts in the long directions of the elastic pieces 80, and contact with the bridging parts 52 in the state in which the elastic pieces 80 run through the through-holes 54 and the lock member 16 is installed on the installation part 38 to restrict the movement toward the upward direction of the lock member 16.

Also, contact parts 84 are provided on the leading end parts of the elastic pieces 80, the contact parts bending toward the direction of moving closer to each other along a roughly horizontal direction. The end faces on the side of the opening part 50 are made to taper for guiding the pipe 12 toward the depth of the connection part 18, spanning from the contact parts to the center parts in the directions of extension of the elastic pieces 80.

Figure 7A:
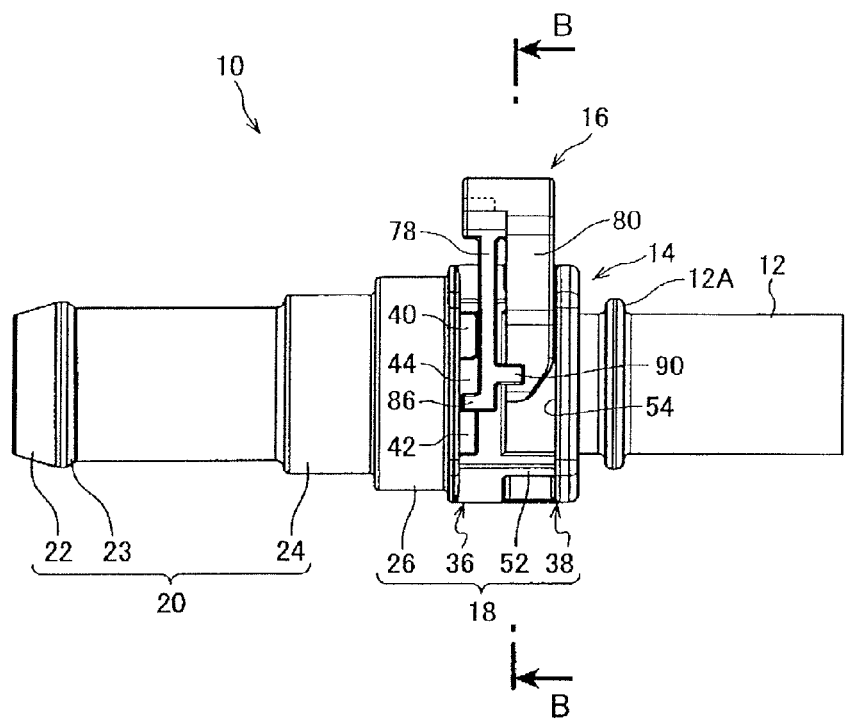
FIG. 7A is a side view of the connector corresponding to FIG. 3.
Figure 7B:
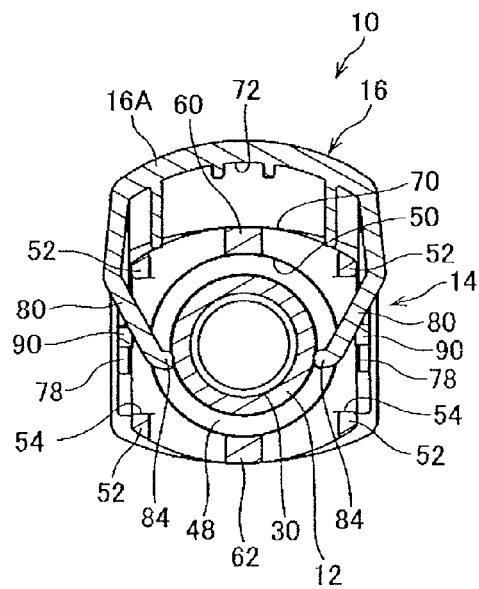
FIG. 7B is a sectional view along B-B line in FIG. 7A.

As illustrated in FIG. 7B, when the pipe 12 is inserted into the opening part 50, the outer perimeter surface of the pipe 12 contacts with the contact parts 84, and the elastic piece 80 are pushed to be spread outward by way of the contact parts 84. Here, the positions of the contact parts 84 are set so as to contact at positions having crossed the axis of the pipe 12.

Meanwhile, as illustrated in FIG. 1, a locking part (coupling part) 86 is provided on the leading end part of the locking piece 78 on the side opposite the elastic piece 80, extending along the horizontal direction and forming the locking piece 78 into an L-shape. The locking part 86 is made capable of being inserted into the gap 44 provided between the projecting part 40 and the projecting part 42 provided on the lock part 36 of the connection part 18.

As illustrated in FIG. 7A, a movement in the downward direction of the lock member 16 is restricted in the state in which the locking part 86 is placed inside the gap 44 and contacts with the upper side face of the projecting part 42 (so-called "standby state"). In this state, a gap is provided between the locking part 86 and the lower side face of the projecting part 40, but as previously described, the projecting part not illustrated provided on the elastic piece 80 contacts with the bridging part 52 in the state in which the lock member is installed on the installation part 38, and a movement toward the upward direction of the lock member 16 is restricted.

In other words, in the standby state of the lock member 16, movements in the upward and downward directions of the lock member 16 are restricted. Also, in the standby state, the pipe 12 is made capable of being inserted into the opening part 50.

Also, a gap is provided on the end part side of the locking piece 78 with the locking part 86 along the direction of extension of the locking piece 78, and a pressing piece (pressing part) 90 extending along a horizontal direction is provided on the side opposite the locking part 86. As illustrated in FIG. 6B, the pressing part 90 is placed on the outside of the elastic piece 80 in a state in which a gap is provided with the elastic piece 80, and as illustrated in FIG. 7B, the elastic piece 80 contacts with the pressing piece 90 by being pushed to spread outward.

Figure 8A:
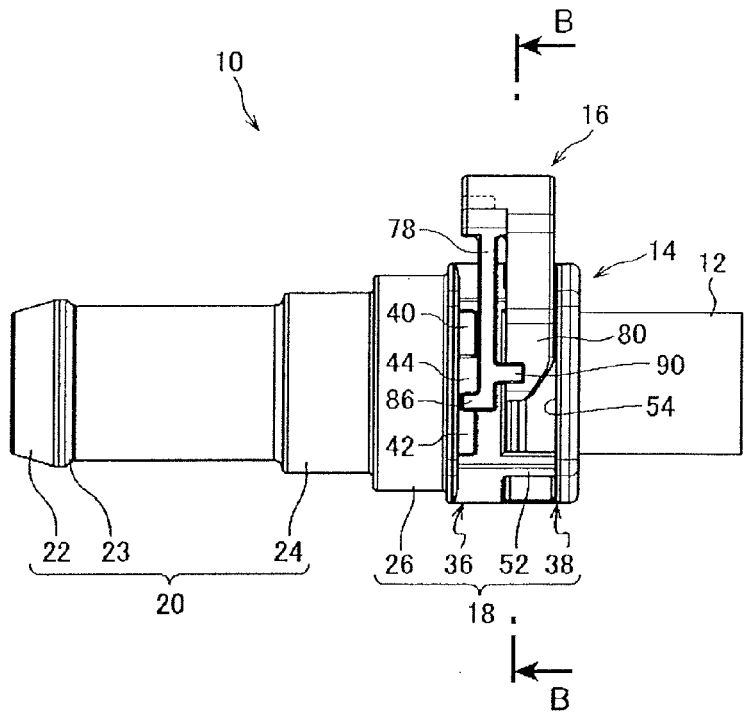
FIG. 8A is a side view of the connector corresponding to FIG. 4.
Figure 8B:
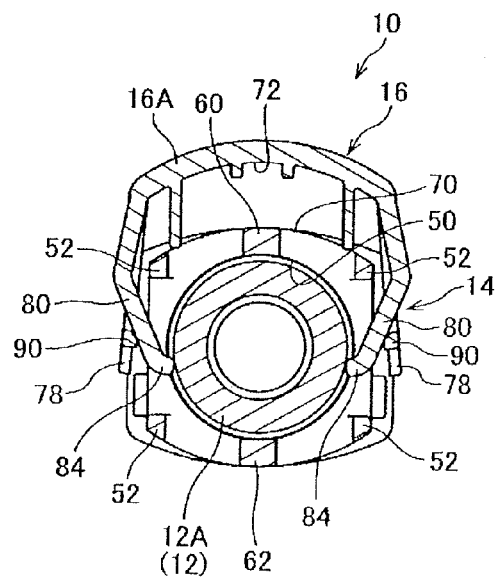
FIG. 8B is a sectional view along B-B line in FIG. 8A.

In this state, as illustrated in FIG. 8B, when the elastic piece 80 is further pushed to spread, the locking piece 78 is pushed to spread outward by way of the pressing piece 90. At this time, it comes to a state in which an urging force is accumulated in the elastic piece 80 and the locking piece 78, but when the locking piece 78 is pushed to spread outward, the locked state in which the locking part 86 of the locking piece 78 is in contact with the projecting part 42 in the standby state of the lock member 16 comes to be unlocked.

Here, as previously described, the position of the contact part 84 provided on the leading end part of the elastic piece 80 is set so as to contact at a position having crossed the axis of the inserted pipe 12. Therefore, when the locked state in the standby state of the locking part 86 of the locking piece 78 is unlocked, the elastic piece 80 and the locking piece 78 return releasing the urging force, and as illustrated in FIG. 9B, the contact part 84 of the elastic piece 80 turns inward along the outer perimeter surface of the flange part 12A of the pipe 12, and moves the lock member 16 to the connected position.

At this time, the locking part 86 rides over the upper face of the projecting part 42, and contacts with (strikes) the lower side face of the projecting part 42, and a movement in the upward direction of the lock member 16 is restricted. Also, in this state, the urging force in the elastic piece 80 and the locking piece 78 is released. Also, roughly simultaneously with the upward movement of the locking part 86 being restricted, the base part 16A of the lock member 16 contacts with the upper wall 36B of the lock part 36, and the downward movement of the lock member 16 is restricted. In other words, in this state, the movements in the upward and downward directions of the lock member 16 come to be restricted (so-called "connected state").

In the present embodiment, the locking part 86 contacts with the upper side face of the projecting part 40 in the standby state of the lock member 16, and contacts with the lower side face of the projecting part 42 in the connected state of the lock member 16, but the invention is not limited to this, because it is acceptable as long as the movement of the lock member 16 is restricted in the standby state and the connected state of the lock member 16. For example, a recessed part to which the locking part 86 is capable of coupling or locking may be provided in the recessed form instead of the projecting parts 40 and 42.

(Operation and Effect of the Connector)

The operation and effect of the connector according to the mode of working are next described.

Figure 2:
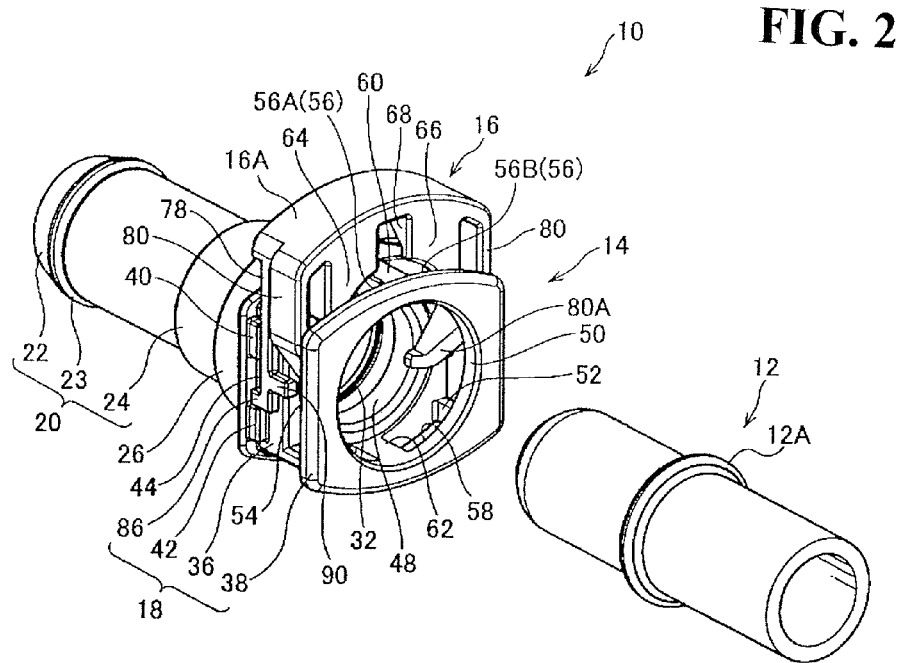
FIG. 2 is a perspective view illustrating the connector according to the first embodiment, illustrating the standby position of the lock member.

As illustrated in FIGS. 2, 6A, and 6B, in the state (standby state) in which a pipe 12 has not been inserted in the connection part 18 of the housing 14 of the connector 10, a gap is provided between the base part 16A of the lock member 16 and the upper wall 36B of the connection part 18.

Meanwhile, in this state, the locking part 86 provided on the leading end part of the locking piece 78 of the lock member 16 is placed in the gap 44 provided between the projecting part 40 and the projecting part 42 of the lock part 36 and contacts with the upper side wall of the projecting part 42, and the movement in the downward direction of the lock member 16 is restricted, and the projecting part not illustrated provided on the elastic piece 80 contacts with the bridging part 52, and the movement in the upward direction of the lock member 16 is restricted. In other words, in the standby state of the lock member 16, the movements in the upward and downward directions of the lock member 16 are restricted.

Figure 3:
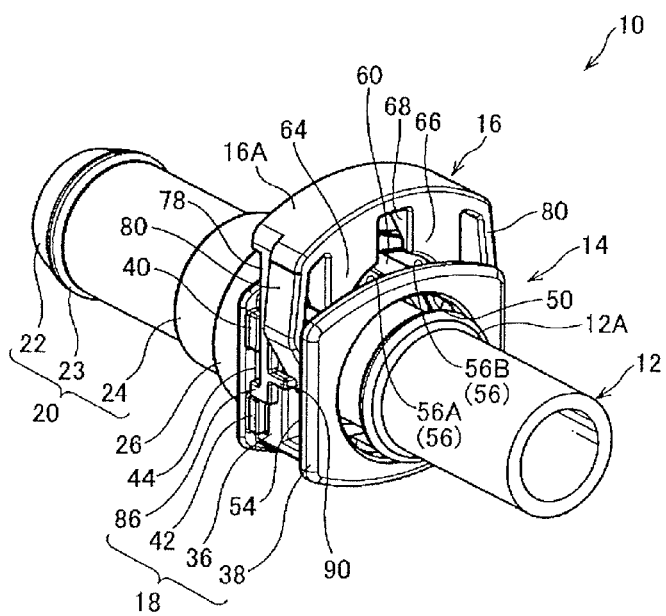
FIG. 3 is a perspective view illustrating the connector according to the first embodiment, illustrating the state in which a pipe is inserted.

In this state, as illustrated in FIGS. 3, 7A, and 7B, when the pipe 12 is inserted into the opening part 50 of the connection part 18, the outer perimeter surface of the pipe 12 contacts with the contact part 84 provided on the leading end part of the elastic piece 80, and pushes the elastic piece 80 to spread outward by way of the contact part 84.

Figure 4:
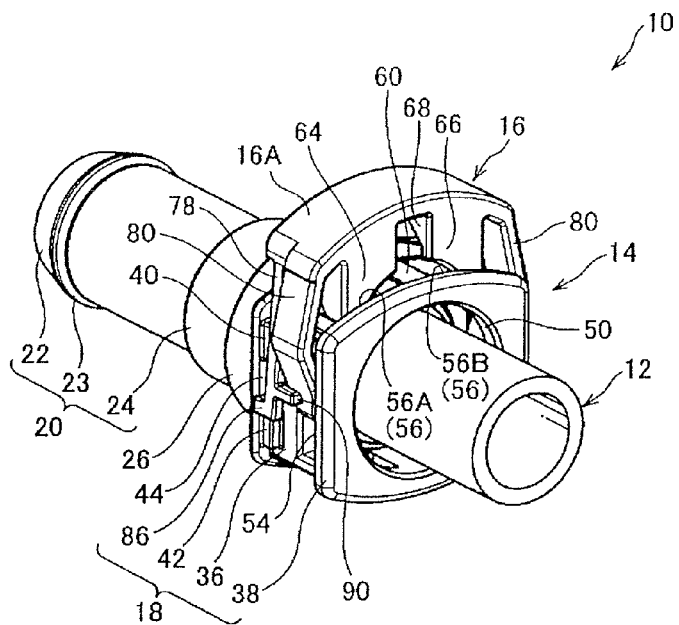
FIG. 4 is a perspective view illustrating the connector according to the first embodiment, illustrating the state in which a pipe is inserted.
Figure 5:
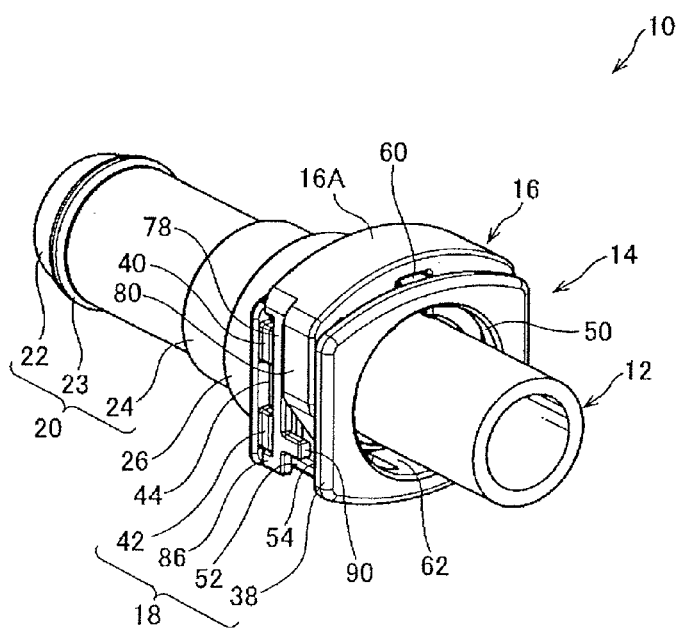
FIG. 5 is a perspective view illustrating the connector according to the first embodiment, illustrating the connected state of the lock member.

Furthermore, when the pipe 12 is pushed toward the depth of the connection part 18, as illustrated in FIGS. 4, 8A, and 8B, the contact part 84 is further pushed to spread outward. By this, the elastic piece 80 is further pushed to spread outward, the elastic piece 80 contacts with the pressing piece 90, and the locking piece 78 is pushed to spread outward by way of the pressing piece 90. Also, by this, the locked state in the standby position of the locking part 86 of the locking piece 78 is unlocked, and the lock member 16 becomes capable of moving toward the downward direction of the connection part 18.

Meanwhile, the contact part 84 is set so as to contact at a position having crossed the axis of the inserted pipe 12, and urging force is accumulated in the locking piece 78 and the elastic piece 80. Therefore, when the locked state in the standby position of the locking part 86 of the locking piece 78 is unlocked, the elastic piece 80 and the locking piece 78 return while releasing the urging force.

By this, as illustrated in FIGS. 8B and 9B, the contact part 84 of the elastic piece 80 turns inward along the outer perimeter surface of the flange part 12A of the pipe 12, and moves the lock member 16 downward. At this time, the locking part 86 rides over the upper face of the projecting part 42, and contacts with the lower side face of the projecting part 42, an upward movement of the lock member 16 is restricted, and the pipe 12 is connected to the connector 10 at the prescribed position (connected position).

Thus, the locking part 86 of the locking piece 78 provided on the lock member 16 moves between the standby position, in which the locking part 86 is placed inside the gap 44 provided between the projecting part 40 and the projecting part 42 provided on the lock part 36 of the connection part 18 and contacts with the upper side face of the projecting part 42, and the connected position, in which the locking part 86 contacts with the lower side face of the projecting part 42, and when the pipe 12 is inserted up to the prescribed position in the standby state of the lock member 16, the lock member 16 moves from the standby position to the connected position and is locked.

In other words, when the pipe 12 is inserted up to the prescribed position in the standby state of the lock member 16, the lock member 16 automatically moves from the standby position to the connected position, and the lock member 16 is locked, and therefore, in this state, the fact that the pipe 12 is connected at the prescribed position can be confirmed. Therefore, the lock member 16 is not locked unless the pipe 12 has been inserted up to the prescribed position, and misrecognition of the connected state of the pipe 12 can be avoided.

Meanwhile, the elastic piece 80 and the locking piece are pushed to spread outward when being contacted by the flange part 12A of the pipe 12 and urging force is accumulated, but when the locked state in the standby position of the locking part 86 of the locking piece 78 is unlocked, the elastic piece 80 and the locking piece 78 return along the outer perimeter surface of the flange part 12A of the pipe 12 and release the urging force.

Therefore, sagging of the elastic piece 80 and the locking piece 78 due to creep can be suppressed. "Return" here includes the case in which all of the urging force in the elastic piece 80 and the locking piece 78 is released and the elastic piece 80 and the locking piece 78 return to the natural state, as well as the case in which some urging force remains in the elastic piece 80 and the locking piece 78.

Also, the elastic piece 80 extends into the opening part 50 of the connector 10, and is pushed to spread outward when being contacted by the flange part 12A of the pipe 12, but at this time, the elastic piece unlocks the locked of the locking part 86 of the locking piece 78 in the standby position of the lock member 16.

By this, the elastic piece 80 returns, the contact part 84 of the elastic piece 80 turns inward following the outer perimeter surface of the flange part 12A of the pipe 80, and moves the lock member 16 to the connected position. In other words, the operation of connection of the pipe 12 is simple because the connector is a so-called "one-touch type," in which the pipe 12 is connected to the connector 10 by just inserting the pipe 12 into the opening part 50 of the connector 10, and the connector is convenient with good operability because there is no need for the operator to manually move the lock member 16.

Also, in the present mode of working, the elastic piece 80 and the locking piece 78 are integrally provided on the lock member 16 and the slit 82 is provided between the elastic piece 80 and the locking piece 78, whereby the locking piece 78 and the elastic piece 80 are made capable of being elastically deformed. In other words, the locking piece 78 and the elastic piece 80 are integrally molded. By this, the number of parts can be reduced and reduction of cost can be achieved.

Meanwhile, when removing the pipe 12 from the connector 10, in the connected position illustrated in FIG. 9A, a slotted screwdriver or custom jig is inserted into the operating recessed part 74 provided in the center part of the lock member 16, and the lock member 16 is raised upward. By this, as illustrated in FIG. 8B, the contact part 84 is pushed to spread outward along the outer perimeter surface of the pipe 12, the elastic piece 80 is pushed to spread outward by way of the contact part 84, and the elastic piece 80 contacts with the pressing piece 90, and pushes the locking piece 78 to spread outward by way of the pressing piece 90.

Also, as illustrated in FIG. 8A, the locking part 86 of the locking piece 78 rides over the projecting part 40, and the locked state of the locking part 86 of the locking piece 78 is unlocked. Therefore, the state in which the lock member 16 is raised upward by the slotted screwdriver or custom jig is maintained. Also, in the state in which the lock member 16 is raised upward, the stoppers 64 and 66 have moved to a position that does not interfere with the flange part 12A, and therefore the movement in the direction of removal of the pipe 12 becomes possible.

In the present embodiment, as illustrated in FIG. 1, the pressing piece 90, which extends roughly horizontally toward one end side of the housing 14, and the locking part 86, which extends roughly horizontally toward the other end side of the housing 14, were provided on the locking piece 78 provided on the lock member 16, but any configuration is acceptable as long as the locked state in the standby position of the locking part is unlocked, while being pushed to spread outward by the elastic piece 80.

Therefore, two elastic pieces 80 and locking pieces 78 are not absolutely necessary, and the effect by the present embodiment can be obtained if there is at least one elastic piece 80 and locking piece 78. Also, the shape of the locking piece 78 is limited to the above shape in particular.

Figure 11A:
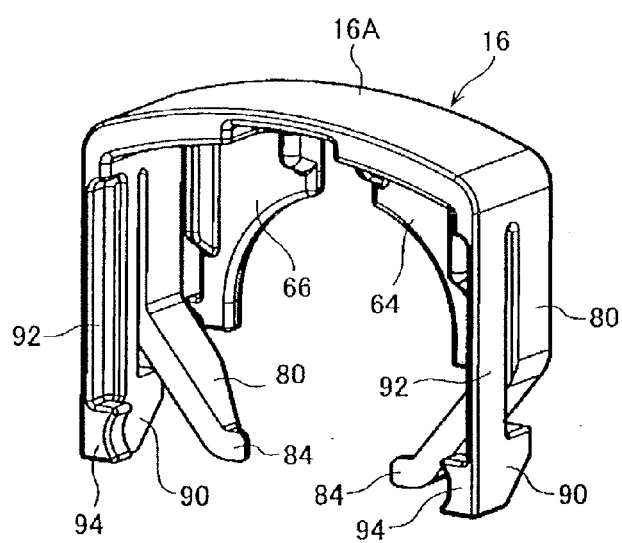
FIG. 11A is a perspective view illustrating a modified example of the lock member of the connector according to the first embodiment.
Figure 11B:
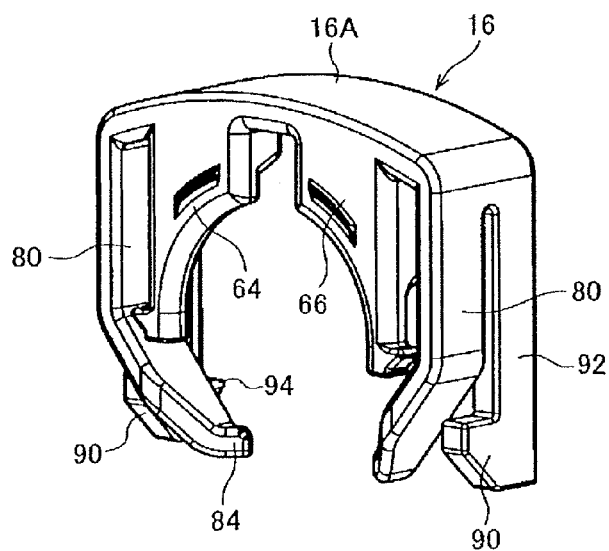
FIG. 11B is a perspective view illustrating a modified example of the lock member of the connector according to the first embodiment, viewed from the underside of FIG. 11A.

For example, the locking piece 78 illustrated in FIG. 1 is enlarged in width as is a locking piece 92 illustrated in FIGS. 11A and 11B (FIG. 11A is a perspective view of FIG. 11B from the underside). Also, a parallelepiped-form locking part 94 is provided on the underside of the locking piece 92 instead of the locking part 86 extending from the locking piece 78.

Figure 12:
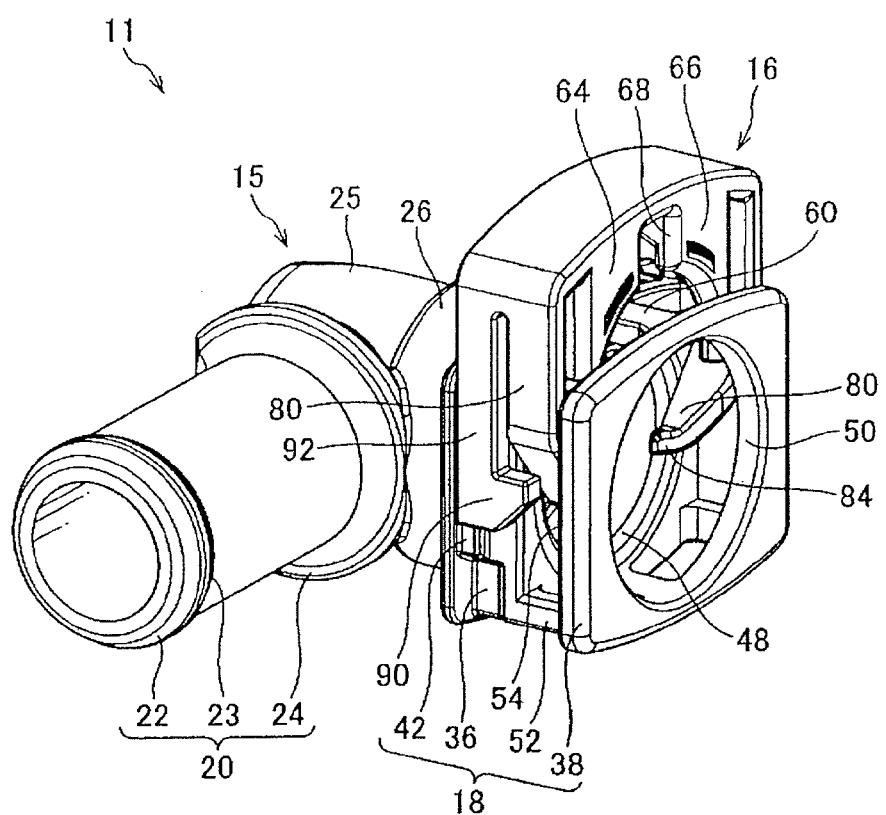
FIG. 12 is an illustration of the standby position of the lock member illustrated in FIG. 11.
Figure 13:
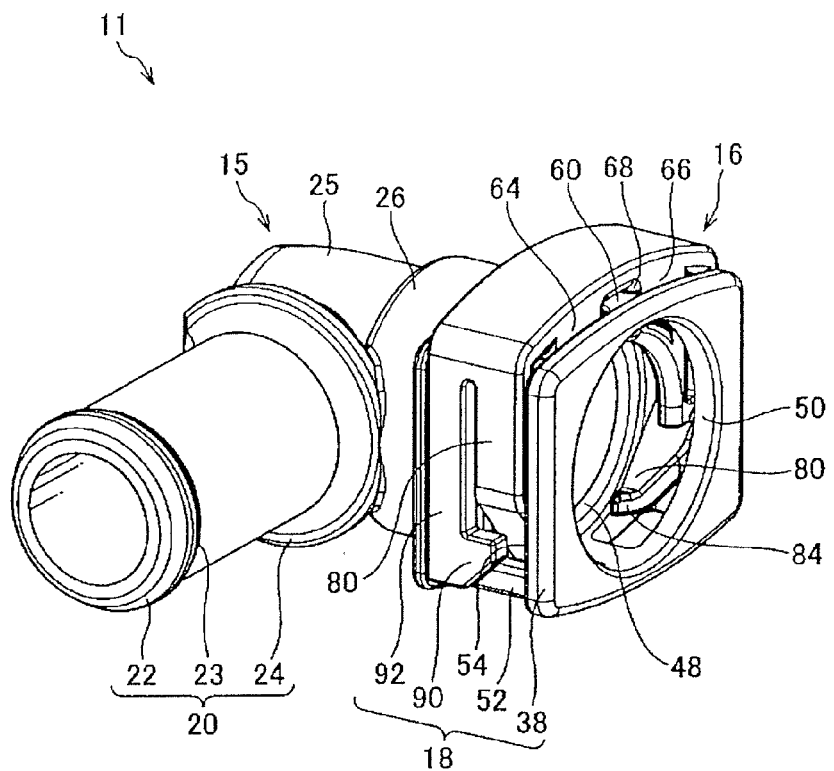
FIG. 13 is an illustration of the connected position of the lock member illustrated in FIG. 11.
Figure 14:
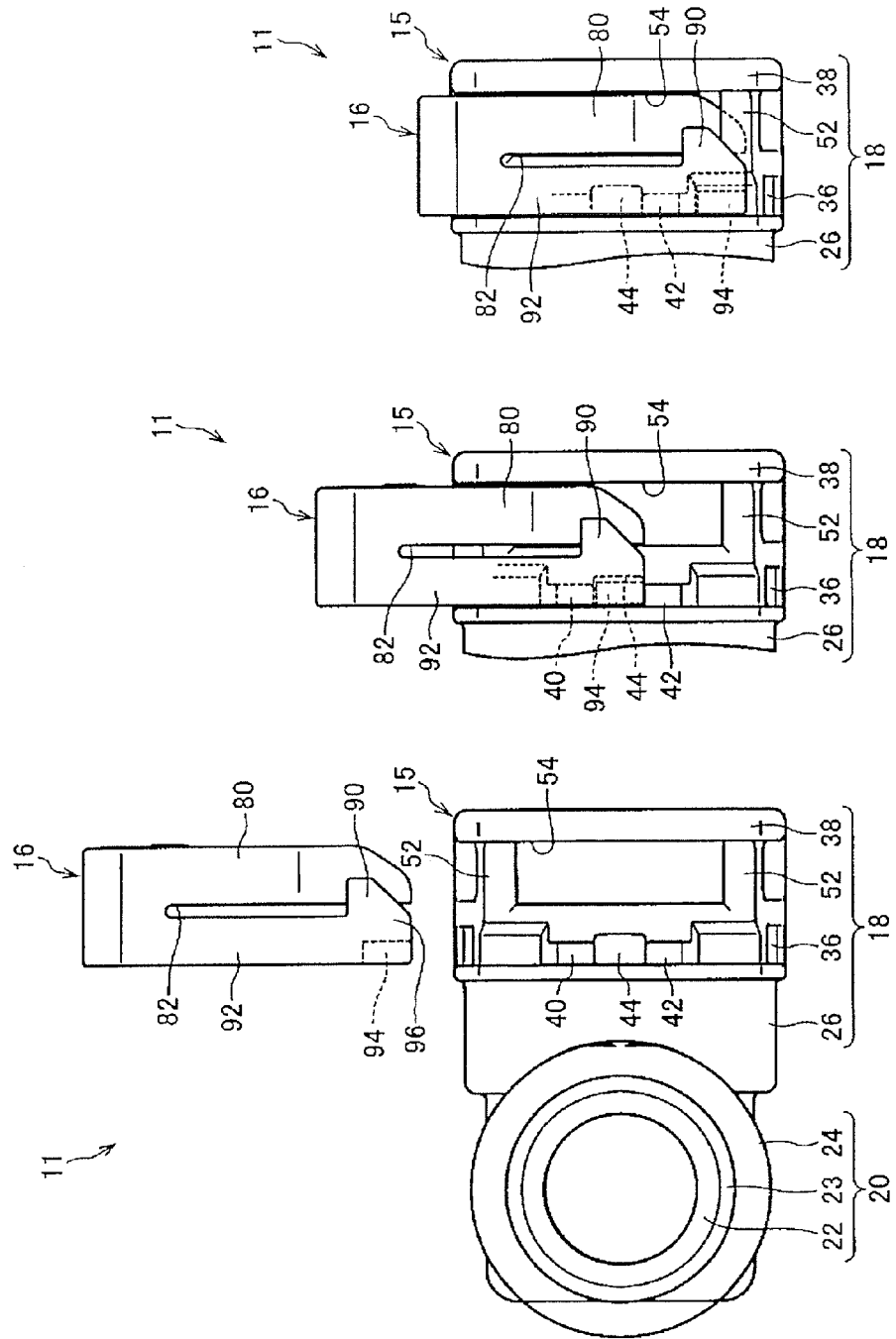

As illustrated in FIGS. 12 and 14B, the locking part 94 of the locking piece 92 is placed inside the gap 44 provided between the projecting part 40 and the projecting part 42 provided on the lock part 36 of the connection part 18 and the lock member 16 becomes in the standby state, and as illustrated in FIGS. 13 and 14C, the locking part 94 contacts with the lower side face of the projecting part 42 and the lock member 16 becomes in the connected state. In FIGS. 14B and 14C, the insertion part 20 illustrated in FIG. 14A is omitted.

Meanwhile, the pressing piece 90 illustrated in FIG. 14A is connected with a leading end part of the locking piece 92, and a roughly triangular shape is formed and reinforced. Thus, the locking piece 92 is enlarged in width and the pressing piece 90 is connected with the leading end part of the locking piece 92, whereby reinforcement of the locking piece 92, the locking part 94, and the pressing piece 90 can be improved.

Also, in the present embodiment, the insertion part 20 and the connection part 18 are provided coaxially on the housing illustrated in FIG. 1, but the invention is not limited to this, because it is acceptable as long as the pipe 12 and the tube 13 can be connected by way of the housing 14.

For example, in a housing 15 of a connector 11 illustrated in FIG. 12, an elbow part 25 is connected between the insertion part 20 and the connection part 18, and the insertion part 20 and the connection part 18 are made to intersect orthogonally by way of the elbow part 25. Thus, the shapes of the housings 14 and 15 are diversified, whereby the connectors 10 and 11 can be used separately with consideration to the positional relationship of the pipe 12 and the tube 13.

Second Embodiment

In the connector 10 of the first embodiment, as illustrated in FIG. 7B, the position of the contact part 84 is set so as to be positioned further downward from the axis of the inserted pipe 12. By this, when the locked state in the standby position of the locking part 86 of the locking piece 78 is unlocked, the elastic piece 80 and the locking piece 78 move the lock member 16 downward while releasing the urging force therein, and the pipe 12 is connected. However, the invention is not limited to this, because it is acceptable as long as it is a so-called "one-touch type."

Figure 15:
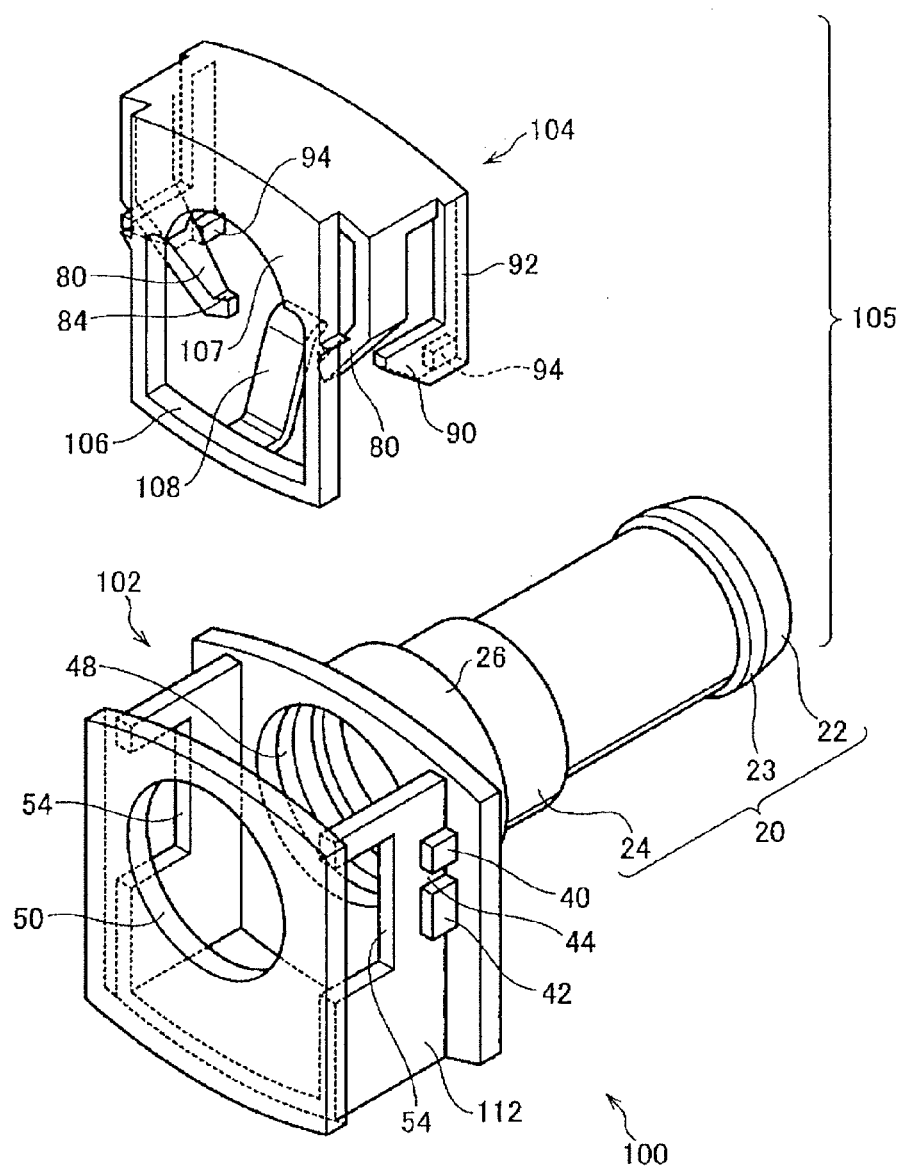
FIG. 15 is an exploded perspective view illustrating the connector according to a second embodiment.

For example, in a connector 105 illustrated in FIG. 15, a connection part 102 of a housing 100 has a roughly square shape, an upper part of the connection part 102 is open, and a lock member 104 is made capable of being inserted. The same symbols are assigned to members having roughly the same operations and effects as in the first mode of working, and the descriptions are omitted.

Figure 17A:
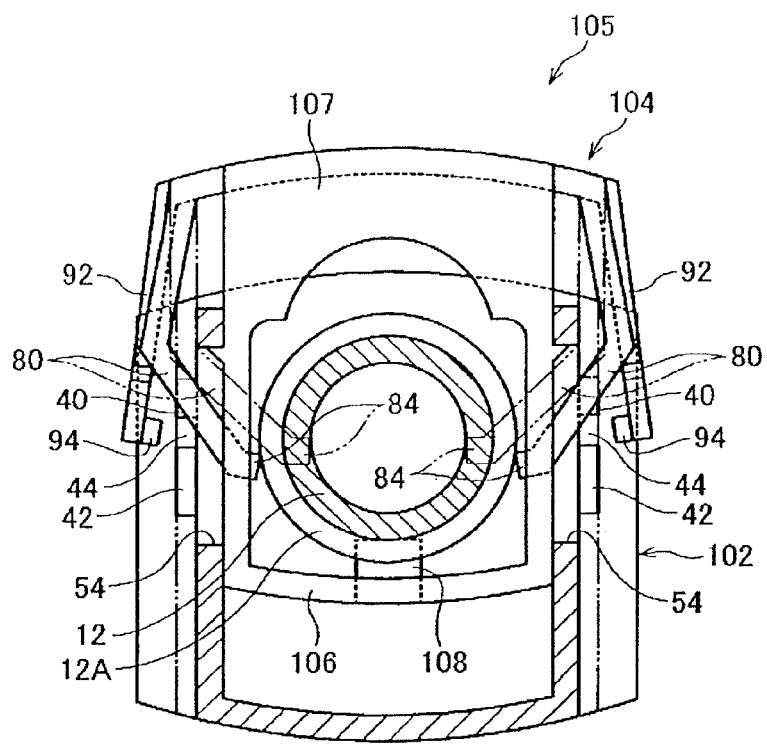
FIG. 17A is a sectional view along 17-17 line in FIG. 16, illustrating the operation of the lock member.
Figure 17B:
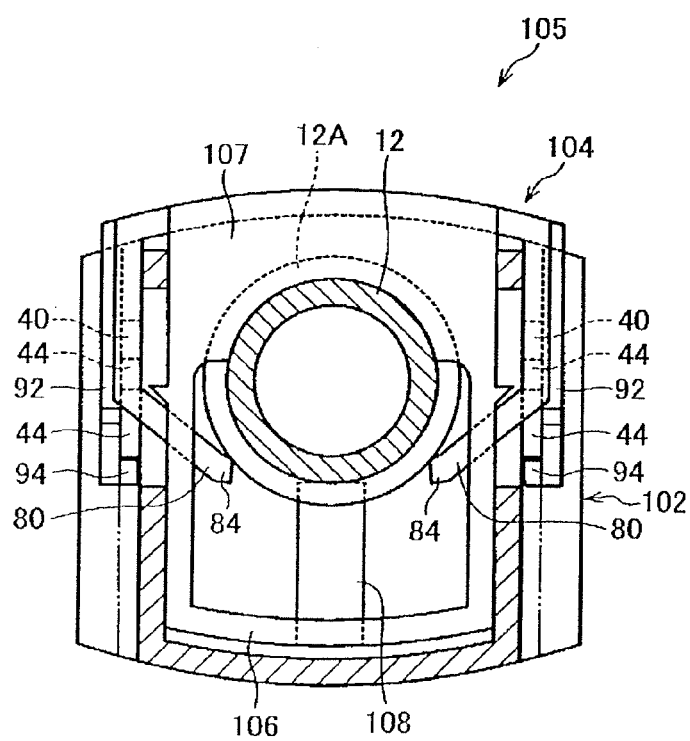
FIG. 17B is a sectional view along 17-17 line in FIG. 16, illustrating the connected state of the lock member.

A frame body 106 hangs down in conformity with the shape of the connection part 102 from one end part (side opposite the locking piece 92) in the width direction of the center part of the lock member 104, and is made capable of being inserted into the connection part 102. A stopper 107 hangs down from an upper end face of the frame body 106, and in the connected position of the lock member 104, as illustrated in FIG. 17B, the stopper 107 and the flange part 12A overlap, and a movement in the axial direction of the pipe 12 together with the bush 48 is restricted. Also, there is provided a spring piece (urging member) 108 extending diagonally upward from the center of a lower end part of the frame body 106 toward the side of the other end part in the width direction of the center part of the lock member 104.

Figure 16:
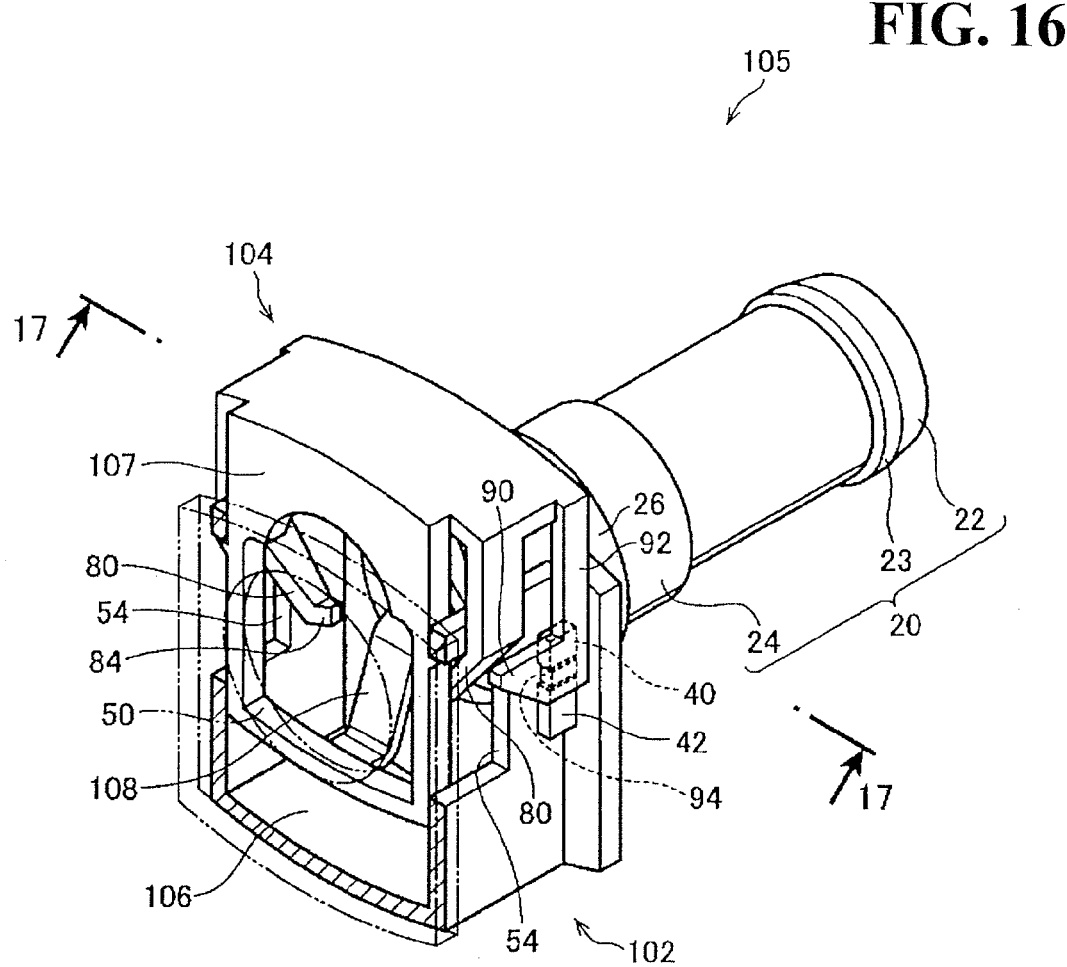
FIG. 16 is a perspective view illustrating the connector according to the second embodiment, illustrating the standby position of the lock member.

As illustrated in FIG. 16, in the standby position of the lock member 104, the locking part 94 provided on the locking piece 92 is placed inside the gap 44 provided between the projecting part 40 and the projecting part 42 provided on a lock part 112 of the connection part 102. In this state, when the pipe 12 is inserted into the opening part 50 of the connection part 102, as illustrated in FIG. 17A, the outer perimeter surface of the pipe 12 contacts with the spring piece 108, and urging force is accumulated in the spring piece 108.

Also, at this time, the outer perimeter surface of the flange part 12A of the pipe 12 contacts with the contact part 84, the elastic piece 80 is pushed to spread outward, the locking piece 92 is pushed to spread outward by way of the elastic piece 80, and the locked state in the standby position of the locking part 94 is unlocked.

Therefore, the frame body 106 is pushed downward by way of the spring piece 108 by the urging force of the spring piece 108. By this, as illustrated in FIG. 17B, the locking part 94 of the locking piece 92 rides over the upper face of the projecting part 42, and contacts with the lower side face of the projecting part 42, and the lock member 104 becomes in the connected state. In this state, the urging force in the spring piece 108 is released.

In other words, here, the members are divided in accordance with their functions between the elastic piece 80 for unlocking the locked state in the standby position of the locking part 94 and the spring piece 108 for moving the lock member 104 to the connected position. Therefore, for example, there is no need to move the lock member 104 to the connected position because the elastic piece 80 returns and turns inward along the outer perimeter surface of the flange part 12A of the pipe 12.

Figure 18A:
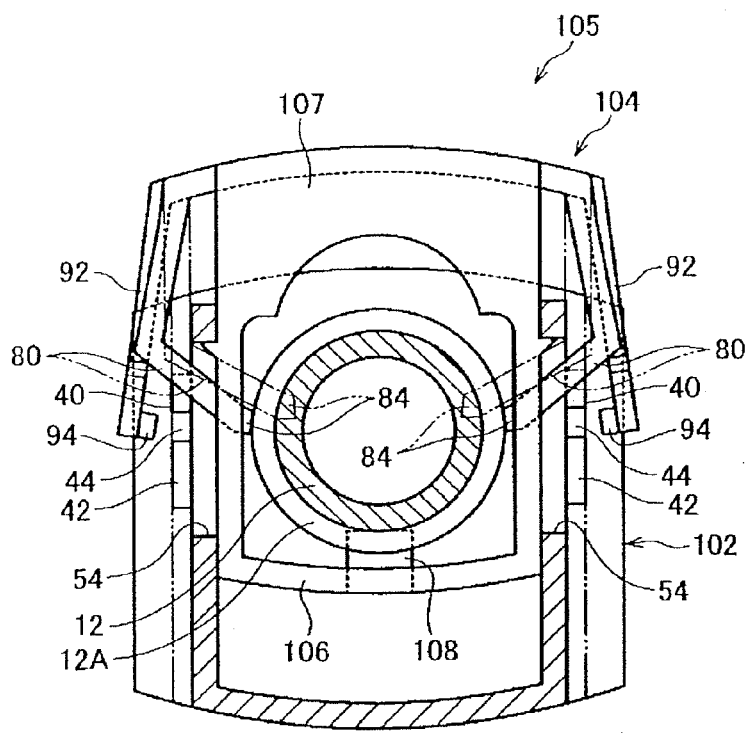
FIG. 18A is a modified example of FIG. 17A.
Figure 18B:
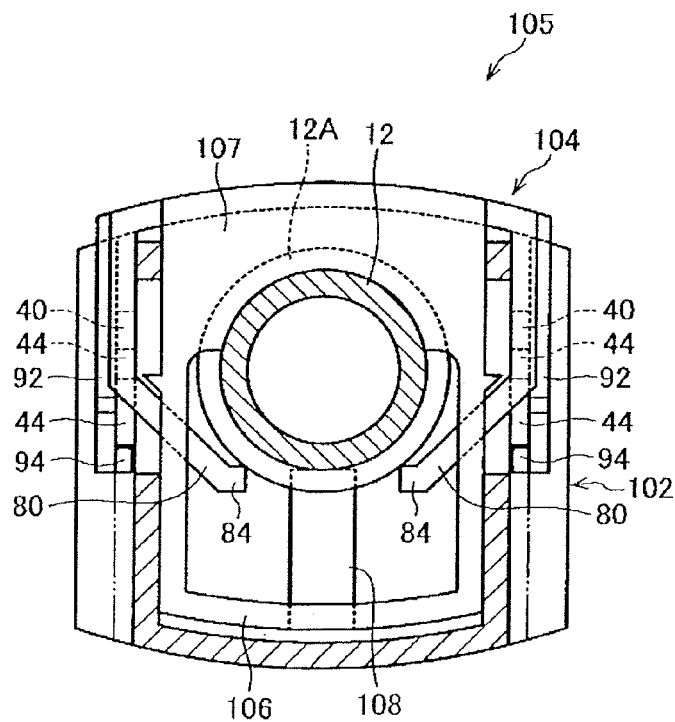
FIG. 18B is a modified example of FIG. 17B.

Accordingly, the elastic piece 80 can be formed with a sufficient length to unlock the locked state in the standby position of the locking part 94. In other words, there is no need to set the position of the contact part 84 to a position crossing the axis of the inserted pipe 12. Therefore, as illustrated in FIGS. 18A and 18B, the length of the elastic piece 80 can be shortened, and the degree of freedom of design is expanded. Also, because the members are divided in accordance with the respective functions, the necessary urging force for the function can be set respectively, and the operability in connection of the pipe 12 can be further improved.

Third Embodiment

In the above embodiments, the tracks of the locking part 86 are the same between the track (forward path) of the locking part 86 of the locking piece 78 when the lock member 16 moves from the standby position illustrated in FIG. 14B to the connected position illustrated in FIG. 14C, and the track (return path) of the locking part 86 of the locking piece 78 when the lock member 16 moves from the connected state to the standby state.

Figure 20:
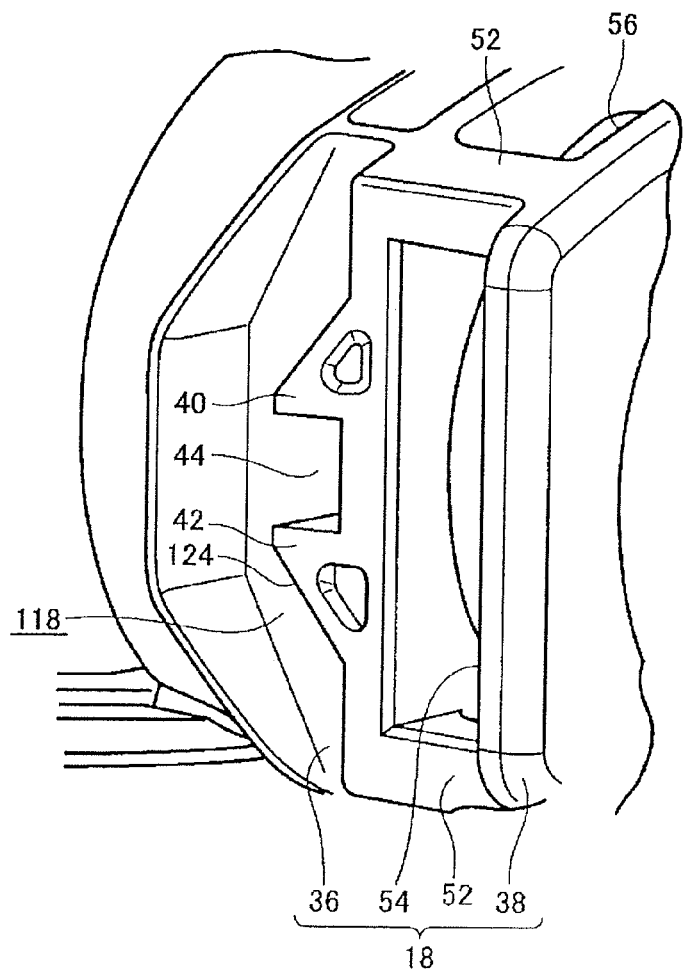
FIG. 20 is a perspective view illustrating the essential parts of the housing of the connector according to the third embodiment.
Figure 23A:
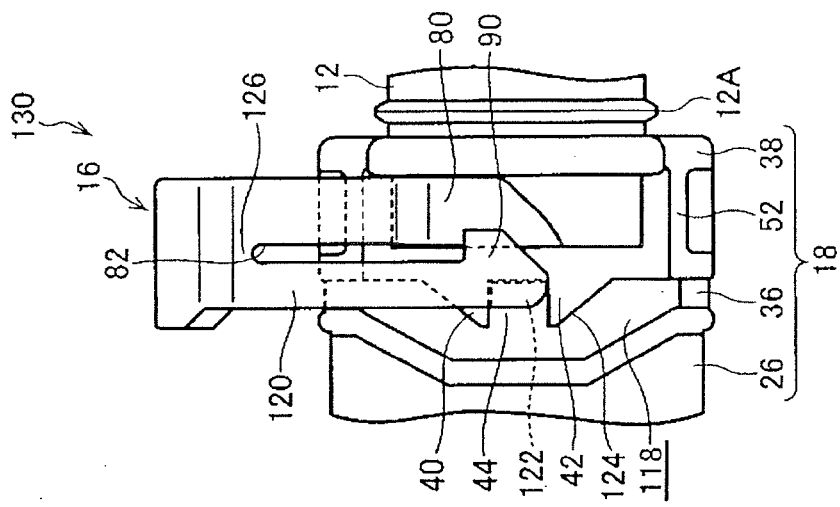
Figure 23B:
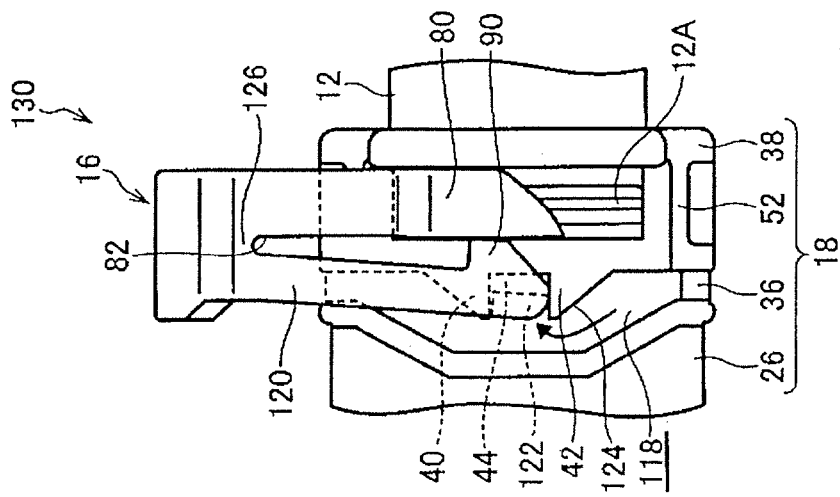
Figure 23C:
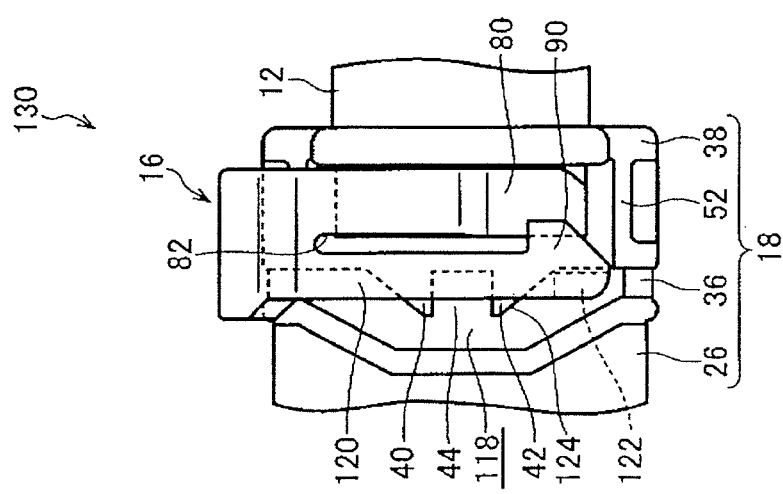

In a connector 130 of the present embodiment, for example, as illustrated in FIG. 20, a guide path 118 to become a separate track from the forward path is provided on the side opposite the installation part 38 on the lock part 36 of the connection part 18, and when the lock member moves from the connected state 10 of the connector illustrated in FIG. 23A to the standby state illustrated in FIG. 23C, a locking part 122 of a locking piece 120 is guided to the guide path 118 as illustrated by the arrow in FIG. 23B.

Figure 19:
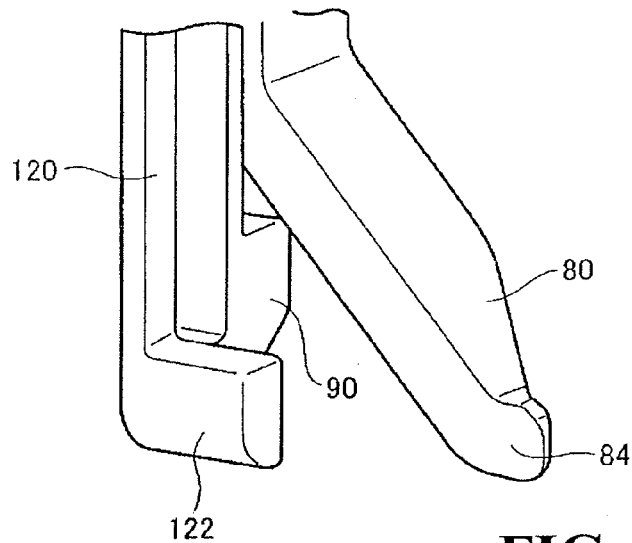
FIG. 19 is a perspective view illustrating the essential parts of the lock member of the connector according to a third embodiment.

Specifically, first, as illustrated in FIG. 19, the parallelepiped-form locking part 122 is provided on an inner face side of the locking piece 120. Also, as illustrated in FIG. 20, a chamfered part 124 is formed on a face on a side of the projecting part 42 opposite the gap 44, and the locking part 122 is guided to the guide path 118 along the chamfered part 124.

As illustrated in FIGS. 23A to 23C, when the lock member 16 is moved from the connected position to the standby position, the locking part 122 of the locking piece 120 is guided to the guide path 118 following the chamfered part 124. At this time, a moment going toward a direction of moving away from the elastic piece 80 acts on the locking piece 120 centered on a base part 126 thereof, and an urging force comes to be accumulated in the locking piece 120. Also, in this state, the locking part 122 and the elastic piece 122 are placed in non-overlapping positions in side view (see FIG. 23B).

Here, the locking part 122 becomes capable of being inserted in the gap 44 when the locking part 122 passes the chamfered part 124, but as illustrated in FIG. 23B, at mid-course of the movement of the locking part 122 toward the depth of the gap 44, the locking part 122 interferes with a side face of the elastic piece 80, and the movement toward the depth of the gap 44 is restricted (provisional standby position to be described).

In this state, when the flange part 12A of the pipe 12 moves away from the contact part 84 of the elastic piece 80, the elastic piece 80 returns, and moves to the inside of the opening part 50 of the connection part 18. Therefore, the state in which the locking part 122 interferes with the side face of the elastic piece 80 is released. Meanwhile, in the state in which the locking part 122 interferes with the side face of the elastic piece 80, a moment going toward a direction of moving away from the elastic piece 80 acts on the locking piece 120 centered in the base part 126 thereof.

Therefore, when the state in which the locking part 122 interferes with the side face of the elastic piece 80 is released, a force as if returning the locking piece 120 to the side of the elastic piece 80 acts by way of the base part 126 of the locking piece 120. By this, the locking piece 120 returns, and the locking part 122 moves toward the depth of the gap 44, and is placed outside of the elastic piece 80 as illustrated in FIG. 23C (standby state).

Figure 21:
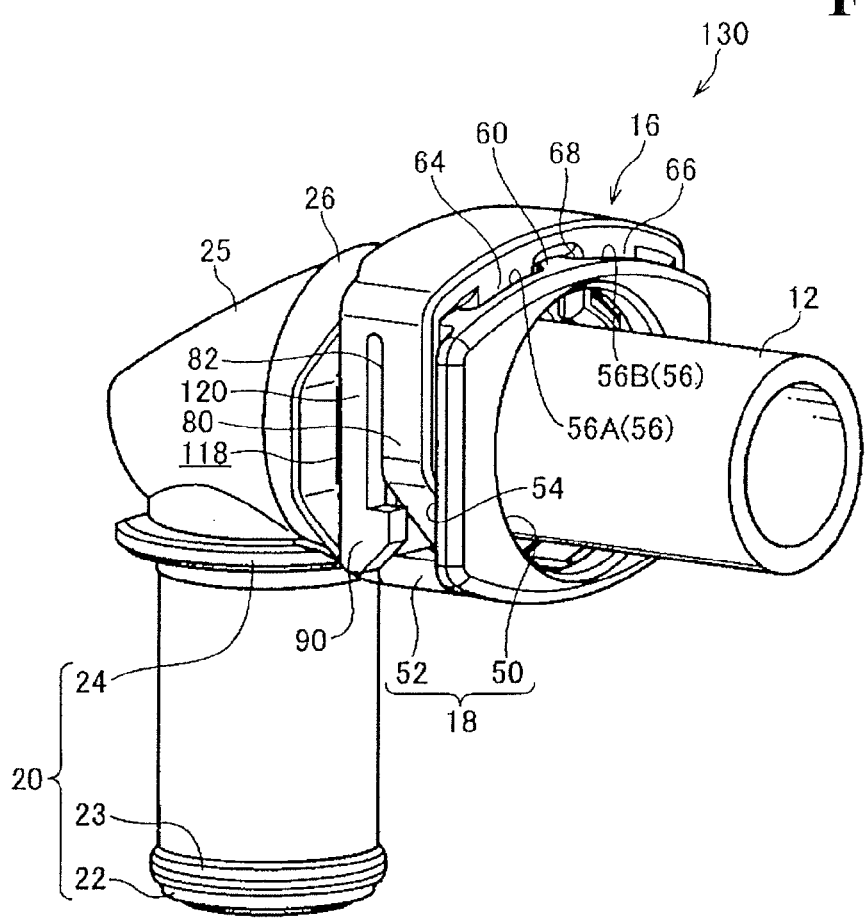
FIG. 21 is a perspective view illustrating the connector according to the third embodiment, illustrating the connected state of the lock member.
Figure 22:
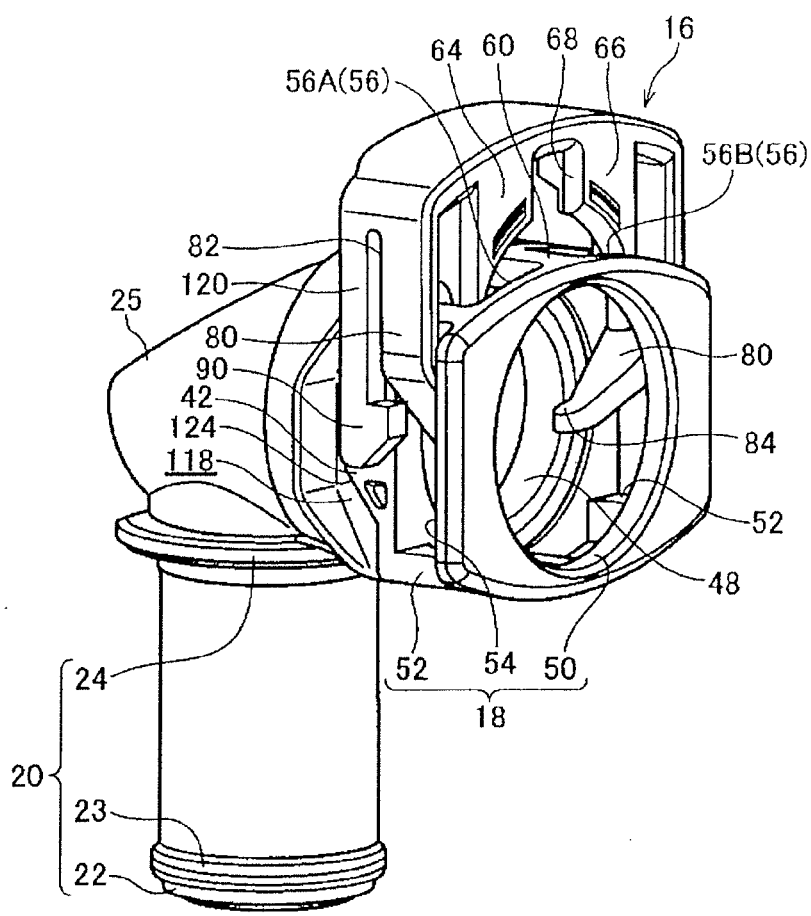
FIG. 22 is a perspective view illustrating the connector according to the third embodiment, illustrating the standby state of the lock member.

Incidentally, as previously described, when the lock member moves from the standby position of the lock member 16 illustrated in FIG. 22 to the connected position of the lock member 16 illustrated in FIG. 21 (forward path), the elastic piece 80 is pushed to spread outward and thereby pushes the locking piece 120 to spread outward by way of the locking part 122, and the locked state in the standby position of the locking part 122 is unlocked. Also, when the locked state of the locking part 122 is unlocked, the elastic piece 80 returns, turns inward along the outer perimeter surface of the flange part 12A of the pipe 12, and moves the lock member 16 to the connected position.

Meanwhile, when removing the pipe 12 from the connector 130, the lock member 16 is first moved from the connected position to the standby position in order to release the connected state between the lock member 16 and the pipe 12, and at this time, the elastic piece 80 is pushed to spread outward along the outer perimeter surface of the flange part 12A of the pipe 12. Therefore, as illustrated in FIG. 23C, when the locking part 122 is placed outside of the elastic piece 80, the elastic piece 80 contacts with the locking part 122, and the locking piece 120 is pushed to spread outward by way of the locking part 122. In other words, in the course of moving the lock member 16 from the connected position to the standby position, the lock member 16 cannot be held in the standby position, and the lock member 16 again returns to the connected position.

However, in the present embodiment, as illustrated in FIG. 23B, the guide path 118 is provided on the lock part 36, the guide path 118 is provided for guiding the locking part 122 in a direction that the pressing piece 90 is retracted from outside of the elastic piece 80 when the lock member 16 returns to the standby position from the connected position, and the lock member 16 is held in the provisional standby position. By this, the elastic piece 80 does not push the locking part 122 to spread outward even though the elastic piece 80 was pushed to spread outward, and therefore, the locking piece 120 is not pushed to spread outward.

In short, the state in which the lock member 16 is held in the provisional standby position is maintained. Therefore, the lock member 16 can be prevented from returning again to the connected position from the standby position when the pipe 12 is removed from the connector 130. Accordingly, because the lock member 16 is held in the provisional standby state when first being raised, there is no need to maintain the state in which the lock member 16 is raised upward using a slotted screwdriver or a custom jig, and the connector is convenient.

EXPLANATION OF THE SYMBOLS

10 Connector
11 Connector
12 Pipe
12A Flange part
14 Housing (connector body)
15 Housing (connector body)
16 Lock member (confirmation member)
42 Projecting part
50 Open part
64 Stopper
66 Stopper
78 Locking piece (leg piece, lock mechanism)
80 Elastic piece (urging member)
86 Locking part (coupling part, lock mechanism)
90 Pressing piece (pressing part, lock mechanism)
92 Locking piece (leg piece, lock mechanism)
94 Locking part (coupling part, lock mechanism)
100 Housing (connector body)
104 Lock member (confirmation member)
105 Connector
107 Stopper
108 Spring piece (urging member)
118 Guide path
120 Locking piece (leg piece, lock mechanism)
122 Locking part (coupling part, lock mechanism)
130 Connector

What is claimed is:
1. A connector, to which a pipe having an annular flange part on an outer perimeter surface is connected, comprising:
   a connector body having a circular opening part in which said pipe is inserted, and a coupling-accepting part formed thereon; and
   a confirmation member arranged on said connector body, and including a lock mechanism locking the confirmation member to said connector body and an urging member unlocking the lock mechanism from the connector body, the lock mechanism including a leg piece disposed in the connector body, a pressing part formed on an end part of said leg piece and positioned at an outside of said urging member, and a coupling part formed on the end part of said leg piece and coupling with the coupling-accepting part, the urging member including an elastic piece extending adjacent to said leg piece and protruding inwardly toward said opening part from an outside of said connector body,
   wherein the confirmation member moves between a standby position where the flange part of said pipe passes through said opening part, and a connected position where the confirmation member moves in a radial direction of said opening part such that said pipe is connected at a prescribed position;

when said pipe is inserted in the opening part, the elastic piece of the urging member is pushed to spread outward and presses the pressing part of the lock mechanism to unlock said confirmation member locked by said lock mechanism, and when said flange part contacts the elastic piece, the elastic piece turns inwardly along the outer perimeter surface of said flange part to move said confirmation member to said connected position while releasing urging forces accumulated in the leg piece and the elastic piece to return shapes thereof.

2. The connector according to claim 1, wherein said confirmation member includes a stopper positioned at an outside of the flange part relative to an insertion direction of the pipe in said connected position and overlapping with said flange part when viewed from an axial direction of the pipe.

3. The connector according to claim 1, wherein said urging member includes a contact part contacting a lower portion of the pipe inserted into said opening part in the standby position of said confirmation member.

4. The connector according to claim 1, wherein said urging member further includes:

a spring piece converting an insertion force of said pipe into a pressing force moving said confirmation member to said connected position, and turning said elastic piece inward along the outer perimeter surface of said flange part.

5. The connector according to claim 4, wherein the confirmation member includes a frame body extending downwardly from an outside thereof relative an insertion direction of the pipe, and having a shape in conformity with the connector body, and the frame body is inserted into the connector body, and the spring piece protrudes in the insertion direction of the pipe from a center part of a lower portion of the frame body in a width direction thereof.

6. The connector according to claim 1, further comprising a guide path for guiding said coupling part toward a direction where said pressing part retreats from an outside of said elastic piece when said confirmation member returns to said standby position from said connected position.

7. The connector according to claim 1, wherein said leg piece and said elastic piece are integrally molded.

8. The connector according to claim 1, wherein the elastic piece includes a contact part at one end thereof, the elastic piece is curved such that the contact part is positioned inside the opening part to contact a lower portion of the pipe relative an axis thereof, and the pressing part protrudes toward the elastic piece to position at an outside of the elastic piece in the standby position;

the coupling part protrudes in a direction opposite to the pressing part, and the coupling part is located above the coupling-accepting part in the standby position and located under the coupling-accepting part in the connected position; and when said pipe is inserted in the opening part, the elastic piece pushes the pressing part and when said flange part contacts the elastic piece, the coupling part rides over the coupling-accepting part to unlock the lock mechanism from the connector body, and thereafter, the contact part moves along the outer perimeter surface of a lower portion of the flange part relative to the axis of the pipe to move in the connected position without applying an external force.

9. A connecting structure, comprising:

the connector according to claim 1, and the pipe connected to the connector, and having the annular flange part on the outer perimeter surface thereof.

* * * * *